US008867889B2

(12) United States Patent
Ito et al.

(10) Patent No.: US 8,867,889 B2
(45) Date of Patent: Oct. 21, 2014

(54) APPARATUS, METHOD, AND COMPUTER PROGRAM FOR PROCESSING INFORMATION

(75) Inventors: Ryogo Ito, Tokyo (JP); Junichi Yokota, Kanagawa (JP); Hiroshi Shimono, Tokyo (JP)

(73) Assignee: Sony Corporation (JP)

( * ) Notice: Subject to any disclaimer, the term of this patent is extended or adjusted under 35 U.S.C. 154(b) by 1878 days.

(21) Appl. No.: 11/711,596

(22) Filed: Feb. 27, 2007

(65) Prior Publication Data

US 2007/0223879 A1    Sep. 27, 2007

(30) Foreign Application Priority Data

Feb. 28, 2006    (JP) ................................ P2006-053812

(51) Int. Cl.
| | |
|---|---|
| *H04N 7/00* | (2011.01) |
| *G06F 3/06* | (2006.01) |
| *G06F 11/14* | (2006.01) |
| *G11B 20/10* | (2006.01) |

(52) U.S. Cl.
CPC ............ *G06F 3/0643* (2013.01); *G06F 3/0619* (2013.01); *G06F 11/1435* (2013.01); *G11B 20/10* (2013.01); *G06F 3/0674* (2013.01)
USPC ........................................................ 386/241

(58) Field of Classification Search
CPC ................ G06F 3/0674; G06F 3/0643; G06F 311/1435; H04N 5/85
See application file for complete search history.

(56) References Cited

U.S. PATENT DOCUMENTS

| | | | | |
|---|---|---|---|---|
| 5,522,037 A | * | 5/1996 | Kitagawa et al. ................ 714/40 |
| 7,152,080 B2 | * | 12/2006 | Mikami ................................. 1/1 |
| 2004/0136694 A1 | * | 7/2004 | Iwasaki et al. ................... 386/95 |
| 2005/0028031 A1 | | 2/2005 | Hida et al. |
| 2009/0077312 A1 | * | 3/2009 | Miura ............................ 711/113 |

FOREIGN PATENT DOCUMENTS

| | | |
|---|---|---|
| EP | 0823816 A2 | 2/1998 |
| EP | 0862180 A2 | 9/1998 |
| EP | 1585135 A2 | 10/2005 |
| EP | 1710676 A2 | 10/2006 |
| JP | 07210438 A | 8/1995 |
| JP | 11-203828 A | 7/1999 |
| JP | 2003-006017 A | 1/2003 |
| JP | 2004-157997 A | 6/2004 |
| JP | 2005-050073 A | 2/2005 |
| JP | 2005-115856 A | 4/2005 |
| JP | 2005-115857 A | 4/2005 |

OTHER PUBLICATIONS

Office Action from Japanese Publication No. 2006-053812, dated Mar. 9, 2010.
European Search Report, EP 07003910, dated Apr. 7, 2010.

* cited by examiner

*Primary Examiner* — Huy T Nguyen
(74) *Attorney, Agent, or Firm* — Lerner, David, Littenberg, Krumholz & Mentlik, LLP

(57) ABSTRACT

An information processing apparatus may include a recording controller for controlling recording of management information containing access information corresponding to recording information for an information recording medium. The recording controller may record backup management information on a non-volatile recording medium prior to the recording of master management information on the information recording medium, and record the master management information after recording the backup management information. The recording controller may record a position information mapping table mapping a recording destination of the master management information to a recording destination of the backup management information in the recording of the backup management information.

25 Claims, 18 Drawing Sheets

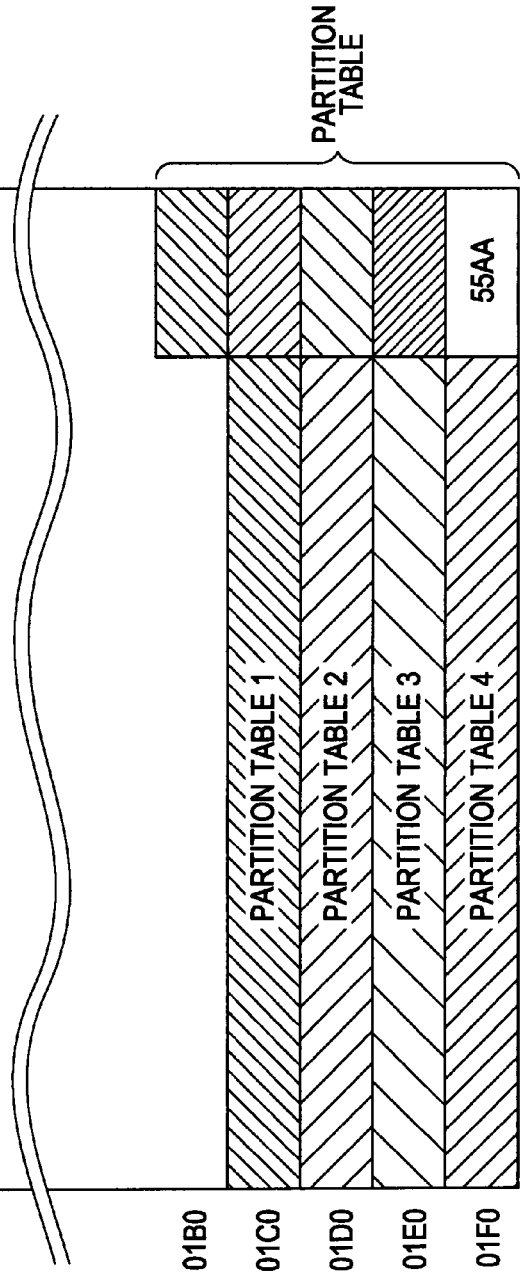

APPARATUS, METHOD, AND COMPUTER PROGRAM FOR PROCESSING INFORMATION

CROSS-REFERENCE TO RELATED APPLICATIONS

This application claims priority from Japanese Patent Application No. JP 2006-053812 filed in the Japanese Patent Office on Feb. 28, 2006, the entire content of which is incorporated herein by reference.

BACKGROUND OF THE INVENTION

1. Field of the Invention

The present invention relates to an apparatus, a method, and a computer program for processing information. More particularly, the present invention relates to an apparatus, a method, and a computer program for recording or reproducing data using management information corresponding to recording information on a recording medium.

2. Description of the Related Art

Management information of a recording data file, such as a file allocation table (FAT), is applied when information recording is performed on a hard disk in a digital video camera or other information processing apparatuses.

The FATs include FAT 16, FAT 32, etc. These file systems manage recording position information, recording position chain information, etc. for a data file to be recorded on an information recording medium.

For example, each file to be recorded on the information recording medium contains file management information (directory entry) such as a file name, recording date and time, etc. The file management information (directory entry) contains access information (leading cluster number) of real data of a file or a directory recorded on the information recording medium. When the data is read from the information recording medium, an information processing apparatus first reads the file management information (directory entry) from the recording medium, thereby obtaining information required for accessing.

If the file management information cannot be read due to a sector destruction on a hard disk, the information processing apparatus cannot read the real data corresponding to a file or a directory having access information thereof contained in the file management information rendered unreadable.

Japanese Unexamined Patent Application Publication No. 2003-006017 discloses a step applied to the event of an reading error of management information. In accordance with the disclosed technique, data is recorded on a recording medium in accordance with a layered file system. Management information managing the layered structure of the file system is recorded on a particular area on the recording medium and information indicating the recording location of real data is recorded in a dual fashion as master information and backup information. Japanese Unexamined Patent Application Publication No. 2005-050073 discloses another technique. In accordance with the technique, file information containing recording position information of leading data of a file is recorded in a different area of a recording device when the file recorded on the device is updated. The master file information is thus restored.

In each of the two disclosed techniques, a plurality of the management information is recorded so that another management information may be used even when one of the management information cannot be read. The recording area of the backup data of the management information is set up in a predetermined area of the recording medium. In accordance with the disclosed techniques, however, no particular recording conditions are provided in the recording of the backup data. The content of the data is diverse. If a variety of data is recorded under a diversity of conditions, it is difficult to back up and use the management information in an effective manner.

SUMMARY OF THE INVENTION

It is thus desirable to provide an information processing apparatus, an information processing method, and a computer program for reliably recording and effectively using backup data of file management information used in a file system.

In accordance with one embodiment of the present invention, an information processing apparatus may include a recording controller for controlling recording of management information containing access information corresponding to recording information for an information recording medium. The recording controller may record backup management information on a non-volatile recording medium prior to the recording of master management information on the information recording medium, and record the master management information after recording the backup management information. The recording controller may record a position information mapping table mapping a recording destination of the master management information to a recording destination of the backup management information in the recording of the backup management information.

The non-volatile recording medium may include a second information recording medium different from the information recording medium as the recording destination of the master management information. The recording controller may control a recording process on device drivers supporting a plurality of recording media, thereby recording the backup management information and the master management information.

The second information recording medium as the recording destination of the backup management information may include a flash memory, and the recording controller may record on the flash memory the position information mapping table mapping the recording destination of the master management information to the recording destination of the backup management information.

The non-volatile recording medium may be the same recording medium as the information recording medium as the recording destination of the master management information, and the recording controller may control a recording process on a device driver supporting a single information recording medium, thereby recording the backup management information and the master management information on different recording areas of the single information recording medium.

The backup management information may be recorded in an empty area of a file system recorded on the information recording medium.

The recording controller may record on the non-volatile recording medium a flag indicating whether the recording of the master management information has been completed, and update a value set in the flag on condition that the recording of the master management information has been completed.

The recording controller may check, at the startup of the information processing apparatus, the value of the flag recorded on the non-volatile recording medium, read the backup management information recorded on the non-volatile recording medium if the value of the flag indicates an uncompleted recording of the master management information, and record the read backup management information as the master management information on the information recording medium.

The recording controller may determine the recording destination of the master management information for the information recording medium based on the position information mapping table recorded on the non-volatile recording medium.

The recording controller may record the backup management information on the non-volatile recording medium by sector, each sector being set on the information recording medium as the recording destination of the master management information.

A recording process of the backup management information in the recording controller may be performed by one of a file system and a device driver, and the one of the file system and the device driver may determine whether the backup management information recording process satisfies a predetermined process condition, and record the backup management information if the backup management information recording process satisfies the predetermined process condition.

The information processing apparatus may further include a reproducing controller for reading information from the information recording medium. The reproducing controller may read the management information from the non-volatile recording medium if the information reading from the information recording medium results in an reading error and if information in the reading error is the management information.

The information processing apparatus may further include a reproducing controller for reading information from the information recording medium. When the management information is read from the information recording medium, the reproducing controller may determine based on the position information mapping table stored on the flash memory whether the backup management information corresponding to the management information in a reading error is recorded, and read the backup management information from the flash memory based on address information recorded in the position information mapping table if the backup management information is recorded based on the position information mapping table.

In accordance with one embodiment of the present invention, an information processing method may include a step of controlling recording of management information containing access information corresponding to recording information for an information recording medium. The step of controlling the recording of the management information may include recording backup management information on a non-volatile recording medium prior to the recording of master management information on the information recording medium, recording the master management information after recording the backup management information, and recording, in the recording of the backup management information, a position information mapping table mapping a recording destination of the master management information to a recording destination of the backup management information.

The non-volatile recording medium may include a second information recording medium different from the information recording medium as the recording destination of the master management information. The step of controlling the recording of the management information may include controlling a recording process on device drivers supporting a plurality of recording media, and thereby recording the backup management information and the master management information.

The second information recording medium as the recording destination of the backup management information may include a flash memory. The step of controlling the recording of the management information may include recording on the flash memory the position information mapping table mapping the recording destination of the master management information to the recording destination of the backup management information.

The non-volatile recording medium may be the same recording medium as the information recording medium as the recording destination of the master management information. The step of controlling the recording of the management information may include controlling a recording process on a device driver supporting a single information recording medium, and thereby recording the backup management information and the master management information on different recording areas of the single information recording medium.

The information processing method may further include steps of recording on the non-volatile recording medium a flag indicating whether the recording of the master management information has been completed, and updating a value set in the flag on condition that the recording of the master management information has been completed.

The information processing method may further include steps of checking, at the startup of the information processing apparatus, the value of the flag recorded on the non-volatile recording medium, reading the backup management information recorded on the non-volatile recording medium if the value of the flag indicates an uncompleted recording of the master management information, and recording the read backup management information as the master management information on the information recording medium.

The information processing method may further include determining the recording destination of the master management information for the information recording medium based on the position information mapping table recorded on the non-volatile recording medium.

The step of controlling the recording of the management information may include recording the backup management information on the non-volatile recording medium by sector, each sector being set on the information recording medium as the recording destination of the master management information.

A recording process of the backup management information in the recording controller may be performed by one of a file system and a device driver, and the one of the file system and the device driver may determine whether the backup management information recording process satisfies a predetermined process condition, and record the backup management information if the backup management information recording process satisfies the predetermined process condition.

The information processing method may further include a step of reading information from the information recording medium. The step of reading the information may include reading the management information from the non-volatile recording medium if the information reading from the information recording medium results in an reading error and if information in the reading error is the management information.

The information processing method may further include a step of reading information from the information recording medium. The step of reading the information may include determining based on the position information mapping table stored on the flash memory whether the backup management information corresponding to the management information in a reading error is recorded when the management information is read from the information recording medium, and reading the backup management information from the flash memory based on address information recorded in the position information mapping table if the backup management information is recorded based on the position information mapping table.

In accordance with one embodiment of the present invention, a computer program for causing an information processing apparatus may perform a step of controlling recording of management information containing access information corresponding to recording information for an information recording medium. The step of controlling the recording of the management information may include recording backup management information on a non-volatile recording medium prior to the recording of master management information on the information recording medium, recording the master management information after recording the backup management information, and recording, in the recording of the backup management information, a position information mapping table mapping a recording destination of the master management information to a recording destination of the backup management information.

The computer program of embodiments of the present invention may be supplied to a general-purpose computer, executing a variety of program code, in a recording medium or a communication medium in a computer readable fashion. The recording media may include a compact disk (CD), a floppy disk (FD), a magneto-optical (MO) disk, etc. The communication media may include a network. By supplying the computer program in a computer readable fashion, a process responsive to the computer program can be executed on a computer system.

These and other objects, features and advantages of the present invention will be more fully understood by reference to the description of the embodiments of the present invention and the accompanying drawings. In the specification, a system may refer to a logical set of a plurality of apparatuses, and is not limited to an apparatus housing elements within the same casing.

In accordance with embodiments of the present invention, the backup management information may be recorded on the non-volatile recording medium prior to the recording of the master management information containing the access information corresponding to the recording information. After the recording of the backup management information, the master management information may be recorded. In the recording of the backup management information, the position information mapping table mapping the recording destination of the master management information to the recording destination of the backup management information may also be recorded. With this arrangement, accessing to the information using backup data is possible even if the recording process of the master management information is aborted.

BRIEF DESCRIPTION OF THE DRAWINGS

FIGS. 2A and 2B illustrate a data structure of master boot record (MBR);

DETAILED DESCRIPTION

An information processing apparatus, an information processing method, and a computer program in accordance with one embodiment of the present invention are described below with reference to the drawings.

Management information of a recording data file, such as a file allocation table (FAT), is applied when information recording is performed on a hard disk in a digital video camera or other information processing apparatuses. The FATs include FAT 16, FAT 32, etc. These file systems manage recording position information, recording position chain information, etc. for a data file to be recorded on an information recording medium. FAT 16/32 is detailed in "Microsoft Extensible Firmware Initiative FAT 32 File System Specification."

Figure 1A:
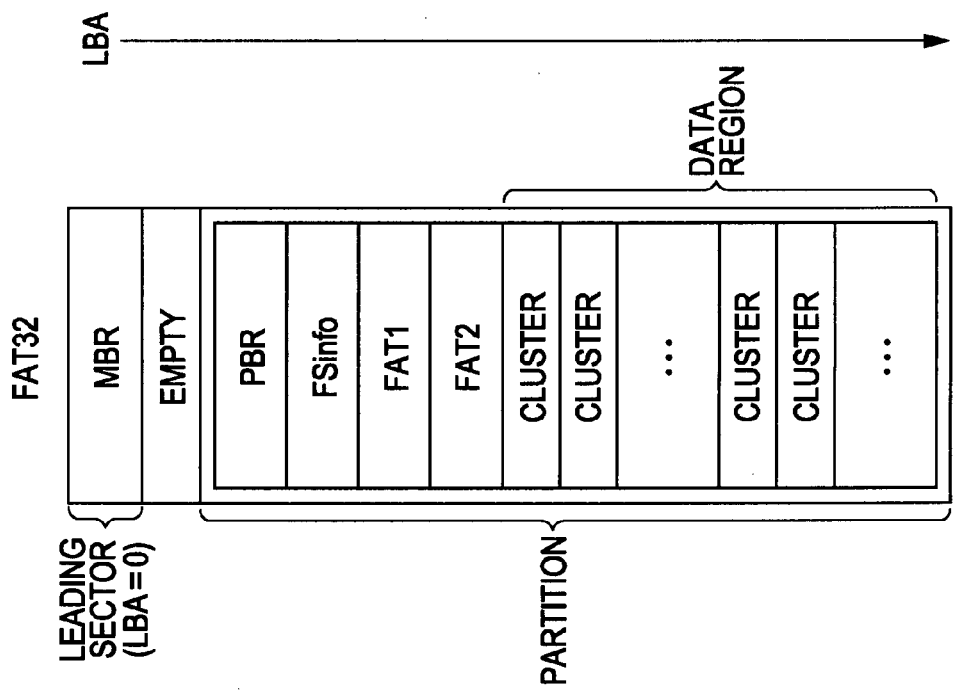
FIGS. 1A and 1B respectively illustrate data structures formatted in accordance with FAT 16 and FAT 32.
Figure 1B:
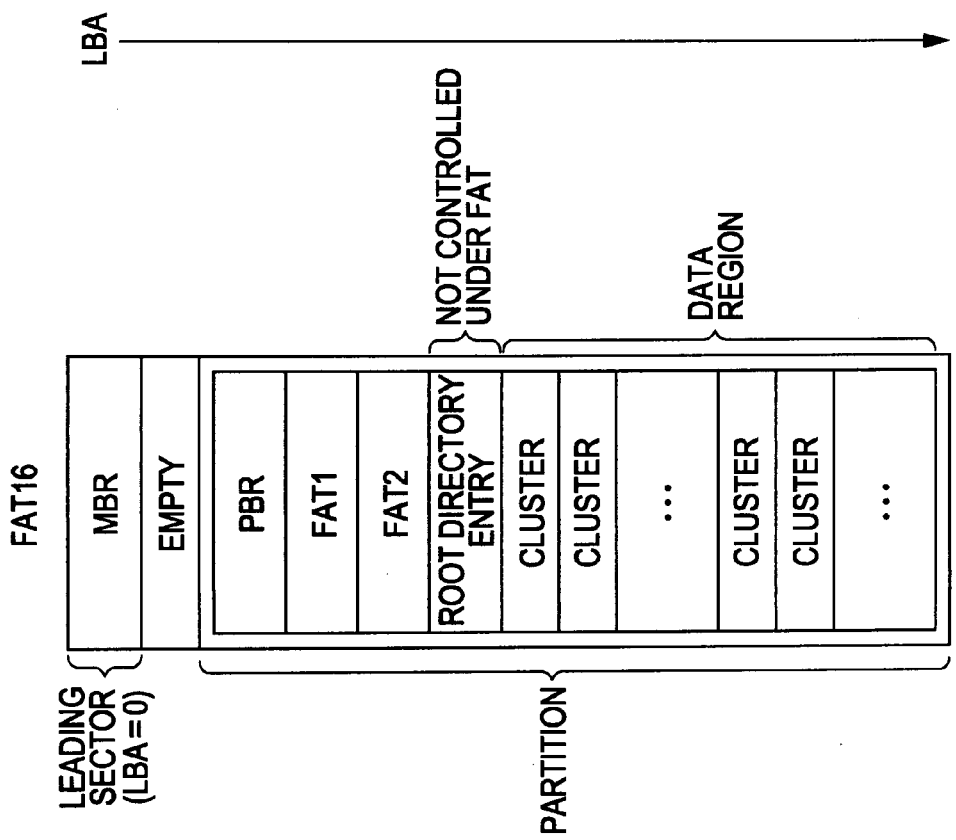

With reference to FIGS. 1A and 1B, data structures in one partition on a hard disk formatted in accordance with FAT 16 and FAT 32 are described. FIG. 1A shows the format in accordance with FAT 16 and FIG. 1B shows the format in accordance with FAT 32.

In the data structure of FAT 16, a leading sector (logical block addressing (LBA)=0) is followed by a master boot record (MBR), a partition boot record (PBR), a file allocation table (FAT) 1, a FAT 2, a root directory entry, and a plurality of clusters in a data region as shown in FIG. 1A.

In the data structure of FAT 32, a leading sector (LBA=0) is followed by a master boot record (MBR), a partition boot record (PBR), file system information (FSinfo), FAT 1, FAT 2, and a plurality of clusters in a data region as shown in FIG. 1B.

The MBR includes startup information and partition information, i.e., a partition table containing a start address and size information of each partition as shown in FIG. 2A. The data structures of FAT 16 and FAT 32 shown in FIGS. 1A and 1B has one partition only. A recording medium such as a hard disk may be divided into a plurality of partitions and managed by partition. In such a case, as shown in FIGS. 2A and 2B, a partition table including a start address and size information of each of the plurality of partitions is set up.

At the startup of the apparatus, a start code (program) is first read from the startup code area of the MBR. The read startup code of the MBR references the partition table in the partition table area formed immediately subsequent to the startup code shown in FIG. 2A, and reads information of a boot sector of a target partition. An operating system (OS) is started by the code (program) of the boot sector.

A plurality of partition tables (for example, four partition tables) may be set. As described above, each partition table contains information relating to the position of each partition area (start address) and the partition size of each partition that is created by dividing the recording area of the hard disk, for example. Two bytes (0E0F) subsequent to the partition table area contains a signature for the partition table.

FIG. 2B illustrates the data structure of the partition table having a 16 byte (128 bit) long data length. An eight byte area from a zero byte to seventh byte is a storage area for use in designating an address in a cylinder/head/sector (CHS) method. An eight byte area from eight byte to 15th byte is a storage area for information designating an address in a logical block addressing (LBA) method.

The CHS method designates an address (position) on a recording medium (hard disk) using a set of three parameters of cylinder, head, and sector. The LBA method designates an address (position) on a recording area of the hard disk by designating a number wherein a unit block (by sector, for example) accessible on the recording area of the hard disk is assigned a respective number (block address (logical address)) starting with zero.

In the storage area of information used in the CHS accessing method, as shown in FIG. 2B, a first byte serves a storage area for active flag information (hereinafter simply referred to as flag information), three bytes from a first byte to a third byte serve as a storage area for use in accessing in the CHS method, a fourth byte serves a storage area for partition type information (hereinafter simply referred to as type information), and three bytes from a fifth byte to a seventh byte serve as a storage area for end sector information used in accessing in the CHS method.

In the storage area of information used in the LBA accessing method, as shown in FIG. 2B, four bytes from an eighth byte to an eleventh byte serve as a storage area for start section information used in the LBA method, and four bytes from a twelfth byte to a fifteenth byte serve as a storage area for partition size used in the LBA method.

The CHS method uses the physical structure of the hard disk as is, and thus uses three parameters of cylinder, head, and sector for addressing. The CHS method is thus complex in terms of software processing. In contrast, the LBA method addresses data using a single parameter called a block address, and an address process during accessing is extremely simple. For this reason, the LBA method becomes predominant as the addressing method on the hard disk. In other recording media, such as a variety of memory cards widely used as a removable medium, the LBA method is typically supported. The information processing apparatus of embodiments of the present invention supports both the CHS method and the LBA method.

Figure 3:
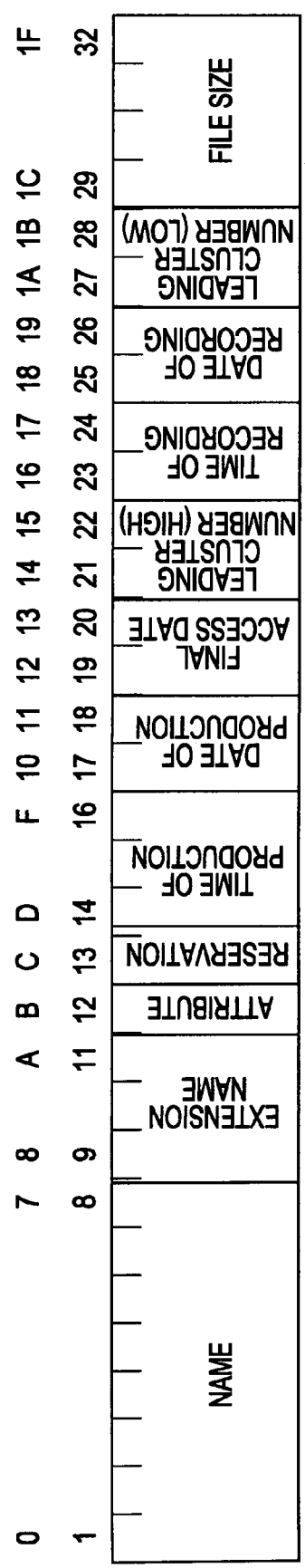
FIG. 3 illustrates an information structure of a directory entry formed for each file.

File management information such as a file name or recording date and time is set in each file recorded on the information recording medium. FIG. 3 illustrates an information structure of a directory entry that is to be stored on a directory in each partition and is the file management information formed on each file. When a file is formed in the partition, the directory entry is the file management information formed in the directory in response to the formed file. The directory entry manages detailed information of the formed file.

As shown in FIG. 3, the directory entry as the file management information for each file includes a name space, an extension name space, an attribute space, a reservation space, a time of production space, a date of production space, a final access date space, a leading cluster number (high) space, a time of recording space, a date of recording space, a leading cluster number (low) space, and a file size space. The directory entry manages corresponding information, namely, a file name, extension name, attribute, reservation, time of production, date of production, final access date, leading cluster number (high), time of recording, date of recording, leading cluster number (low), and file size. Using the directory entry, a file identified by the file name is managed in terms of (1) attribute, (2) leading cluster, (3) file size, (4) date of production, (5) final access date, and (6) date of data recording.

The leading cluster number identifies, by cluster, an storage area of data of a partition with which the data recording of a file begins. In other words, the leading cluster number indicates a storage area with which the data recording begins when the data region of the partition is segmented into storage areas by cluster. As shown in FIG. 3, the leading cluster number is managed according to upper two bytes (high) and lower two bytes (low).

The cluster is contained in the data region, and a minimum unit for managing data in the FAT. The cluster, made of a plurality of sectors, is a minimum recording unit per file. One cluster is composed of n sectors (n=1, 2, 4, 64, 128) and each sector has a sector size of 512 bytes in the hard disk. The sector, which is the minimum unit in the hard disk, is too small to manage files. Using the cluster composed of a plurality of sectors, the management of the file becomes easy. The specific size of the cluster is 32 Kbytes in FAT 16 and 4 Kbytes in FAT 32.

In the data structure shown in FIGS. 1A and 1B, the master boot record (MBR) discussed with reference to FIG. 2A is followed by the partition boot record (PBR) containing the startup code corresponding to the partition, the file allocation table (FAT) 1 and the file allocation table (FAT) 2.

FAT 2 is used as backup data for the FAT 1. More specifically, the FAT 2 stores a copy of the FAT 1.

The data structure of a typical file allocation table (FAT) is described with reference to FIG. 4. The file allocation table (FAT) manages recording position information and recording position chain information of data files to be recorded on a medium (information recording medium).

As described previously, the data of each data file is recorded dispersedly among at least one cluster. The FAT stores chain information of cluster numbers of clusters storing data of each file.

Figure 4:
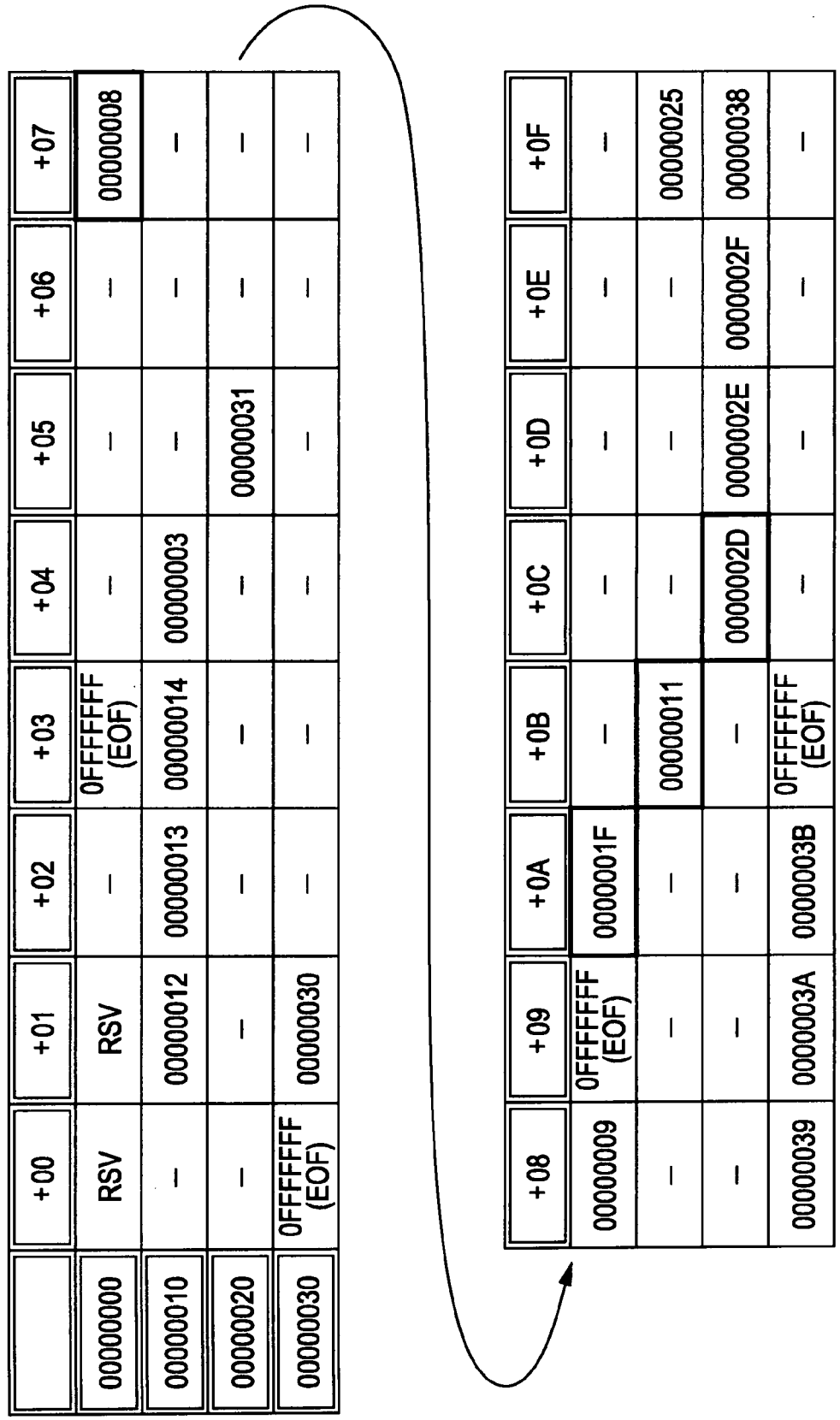
FIG. 4 illustrates a data structure of a typical file allocation table (FAT)

The FAT is split in two parts as shown FIG. 4. Indices in dual-outlined boxes list, as data entries, cluster numbers:

[00000000h]-[0000000Fh]
[00000010h]-[0000001Fh]
[00000020h]-[0000002Fh]
[00000030h]-[0000003Fh]

In the table, [h] is omitted. The cluster number in eight digit number, each from 0 to F, ending with [h] means that the cluster number is shown in a hexadecimal format.

Recorded at the position of a cluster number storing member data of each file is a cluster number storing next data of the file member data. Code [0FFFFFFFh] representing an end of file (EOF) is recorded at the position of an end cluster number. The leading cluster number is recorded at a directory entry of each file as described with reference to FIG. 3.

For example, leading cluster numbers recorded directory entries of files are as follows:
First file: 00000007h,
Second file: 0000000Ah,
Third file: 0000001Bh, and
Fourth file: 0000002Ch.

The leading cluster number of the first file is [00000007h]. By reading the cluster number [00000007h], first data of the first file can be read. The cluster number storing next member data of the first file can be known based on the record information at the cluster number [00000007h] of the FAT of FIG. 4. The cluster number [00000008h] is recorded at the position of the cluster number [00000007h] of the FAT of FIG. 4. It is thus learned that the cluster number storing the next member data of the first file is [00000008h], and data is thus read from the cluster of the cluster number [00000008h].

The cluster number stored in the next member data of the first file is stored at the position of the cluster number [00000008h] of the FAT of FIG. 4. A cluster number [00000009h] is recorded at the position of the cluster number [00000008h] of the FAT of FIG. 4. It is now learned that the cluster number storing the next member data of the first file is [00000009h], and data can thus be read from the cluster of the cluster number [00000009h]. To acquire a cluster number storing next member data, the position of the cluster number [00000009h] of the FAT is referenced. Code [0FFFFFFFh] corresponding to the end of file (EOF) is recorded, and means that there is no subsequent data.

As a result, the first file is determined to be stored in clusters designated by cluster numbers: [00000007h]→[00000008h]→[00000009h].

Similarly, the second file is stored in clusters designated by cluster numbers: [0000000Ah]→[0000001Fh]→[00000025h]→[00000031h]→[00000030h].

The third file is stored in clusters designated by cluster numbers: [0000001Bh]→[00000011h]→[00000012h]→[00000013h]→[00000014h]→[00000003h].

The fourth file is stored in clusters designated by cluster numbers: [0000002Ch]→[0000002Dh]→[0000002Eh]→[0000002Fh]→[00000038h]→[00000039h]→[0000003Ah]→[0000003Bh].

Data of the files is thus acquired from these clusters.

The FAT of FIG. 4 corresponding to FAT 32. In FAT 32, code [0FFFFFFh] corresponds to the EOF. In FAT 16, code [FFFFh] corresponds to the EOF. By detecting the code corresponding to the EOF, the end of the file member data is identified.

Each file to be recorded on the information recording medium contains three factors: a) "directory entry" containing the file name, date and time of production, and file size, b) "FAT" containing chain information of the clusters, and c) "real data" recorded by cluster. These factors are recorded on the information recording medium such as a hard disk. Based on the directory entry and the FAT, the member cluster of each file can be identified and the data can be read.

Figure 5:
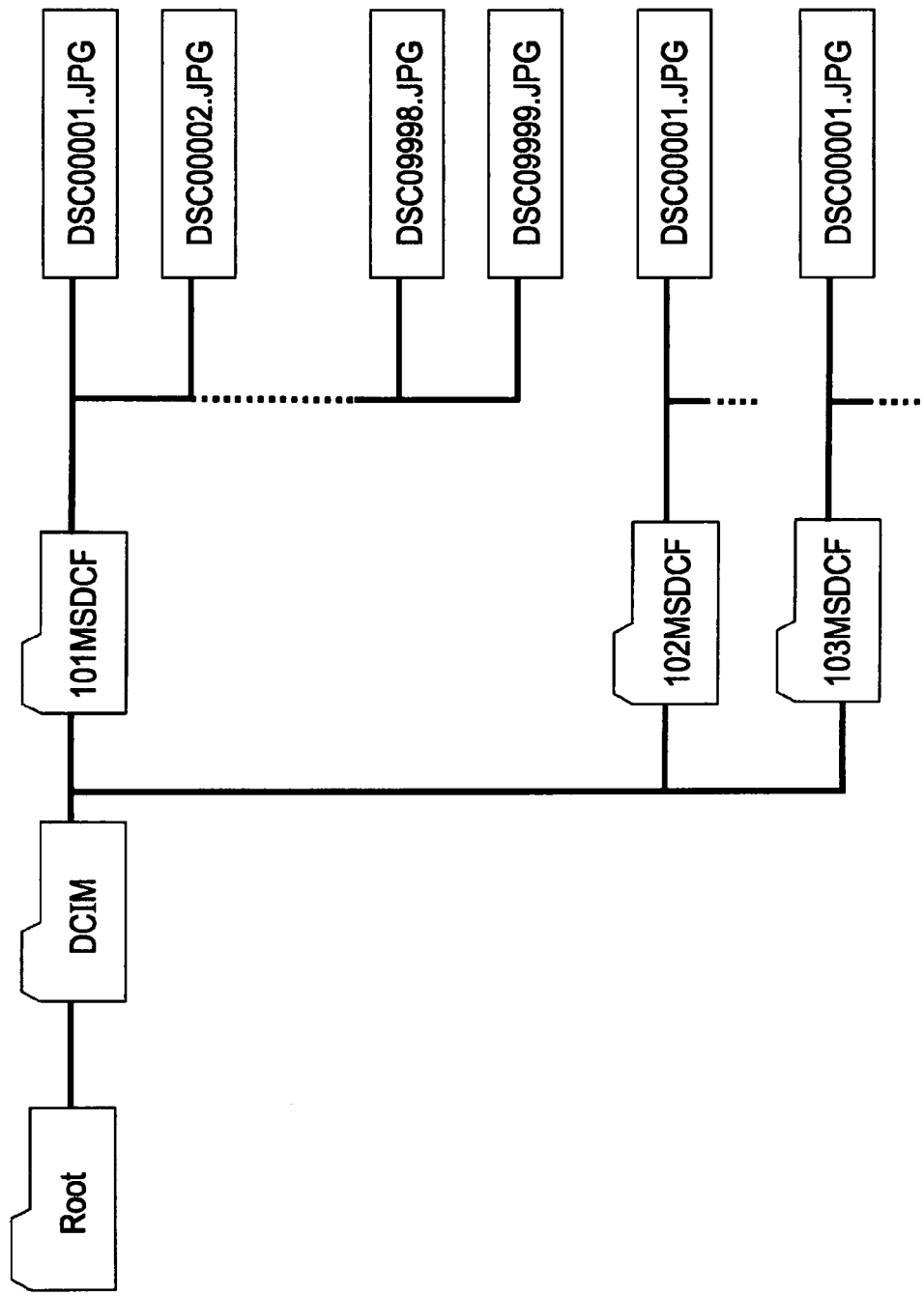
FIG. 5 illustrates a directory structure of data to be recorded on an information recording medium.

The three factors are recorded on the medium such as a hard disk. The three factors are not recorded in a single set at one recording position but are dispersedly recorded. A directory structure of recording data is described below. FIG. 5 illustrates a directory structure applied when data is recorded on a recording medium such as a hard disk in a digital camera.

The digital camera automatically generates a file name in accordance with the design rule for camera file system (DCF), and records a captured still image file or a captured moving image file on a recording medium. In accordance with the DCF, a directory name is produced by adding any character string to a three-character directory number, and a file name is produced by successively arranging any three characters, a four-character file number, and an extension. As shown in FIG. 5, a plurality of lower directories (101MSDCF-103MSDCF) is arranged under a lower directory (DCIM) that is under a root directory. Files DSC00001.JPG . . . are respectively arranged under these lower directories.

Figure 6:
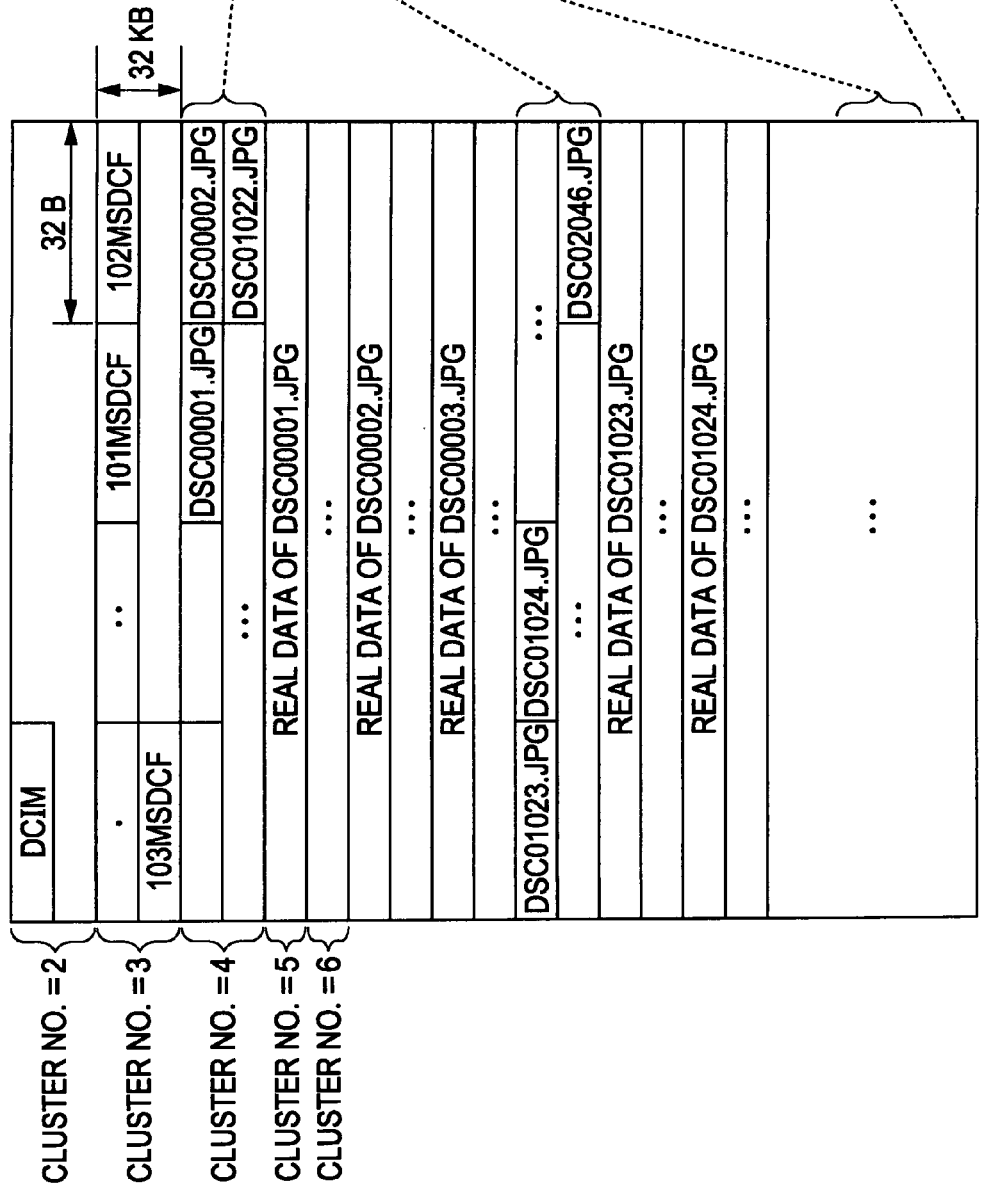
FIGS. 6A and 6B illustrate the arrangement of data and directory entry to be recorded on the information recording medium.

The directory entry as the file management information discussed with reference to FIG. 3 is recorded for each file set in the directories of FIG. 5. For example, as shown in FIG. 6, directory entry information is set for a DCIM file, directory entries are respectively set for 101MSDCF-103MSDCF files, and directory entries are respectively set for the files DSC0001.JPG and subsequent files. These directory entries are recorded on the information recording medium. The data of the files DSC00001.JPG and other files storing the real data are also stored as the management information in an area different from the directory entry on the information recording medium.

The specific data arrangement on the recording medium such as the hard disk is described below with reference to FIG. 6. A cluster (32 Kbytes) comprised of 64 sectors (each having 32 bytes) as a reading unit of data is set on the recording medium such as a hard disk. When data is recorded, the clusters are consumed as shown in FIG. 6A.

More specifically, the directory entry relating to the directory "DCIM" of FIG. 5 is recorded on the position of a cluster number 2 of FIG. 6A. The directory entry relating to the directory "101MSDCF" is recorded on the position of a cluster number 3 of FIG. 6A. The directory entry relating to the file "DSC00001.JPG" is recorded on the position of a cluster number 4, and the data body of "DSC00001.JPG" is recorded starting with a cluster number 5.

The directory entries of the "DSC00001.JPG"-"DSC09999.JPG" under "101MSDCF" of FIG. 5 are recorded dispersedly using a plurality of clusters. For example, as shown in FIG. 6B, the directory entries are recorded among 10 clusters. As shown in FIG. 6B, entries of DSC00001.JPG-DSC01022.JPB are recorded at the cluster of cluster number 4, directory entries of DSC01023.JPG-DSC02046.JPG are recorded on the cluster of a cluster number 11.

The directory entries are recorded dispersedly among clusters of ten different cluster numbers.

Figure 7:
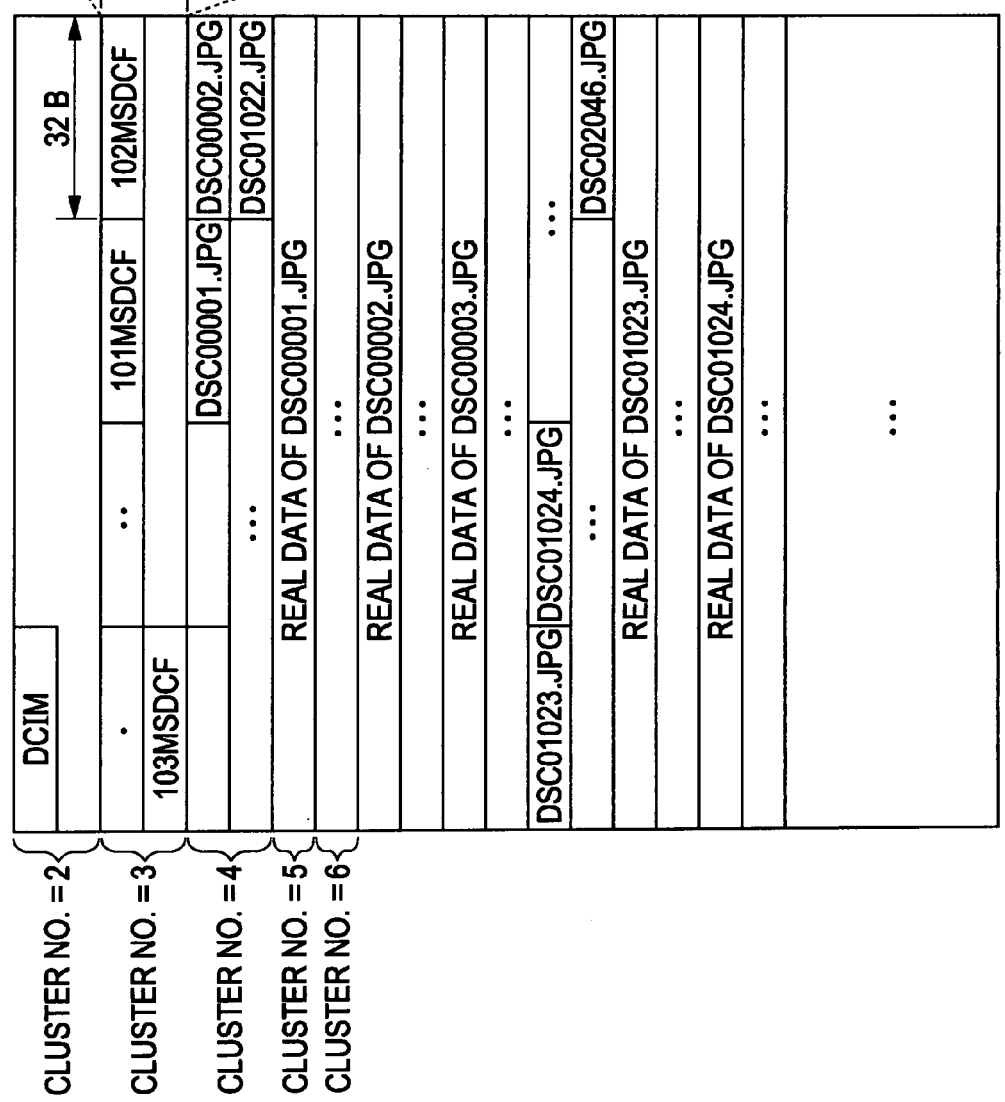
FIGS. 7A and 7B illustrate the arrangement of data and each sector on the information recording medium.

The size of one directory entry as the file management information corresponding to each file discussed with reference to FIG. 3 is 32 bytes. If the sector size is 512 bytes, 16 directory entries (32×16=512) are recorded by one sector (512 bytes) as shown in FIGS. 7A and 7B. If a sector destruction takes place, information will be damaged by sector. In this case, information of a maximum 16 directory entries may be damaged.

The layered structure and the nomenclature rule shown in FIGS. 5 through 7A-7B comply with the design rule for camera file system (DCF). The present invention is applicable to not only the DCF file system, but also a variety of other file systems.

The configuration and process of the information processing apparatus of one embodiment of the present invention are described below. The information processing apparatus of the embodiment of the present invention records the directory entry, namely, the file management information to be recorded on an information recording medium by sector as backup data. When a new data file is set or data updating is performed on a data file, an addition or updating of a directory entry may be required. In such a case, the backup data of the data of the entire sector recording that directory entry is updated.

A system configuration of the information processing apparatus is described below. Data recording on the information recording medium and data acquisition and reproducing from the information recording medium may be performed by causing a central processing unit (CPU) in the information processing apparatus such as a digital video camera or a personal computer (PC) to execute a predetermined data processing program.

Figure 8:
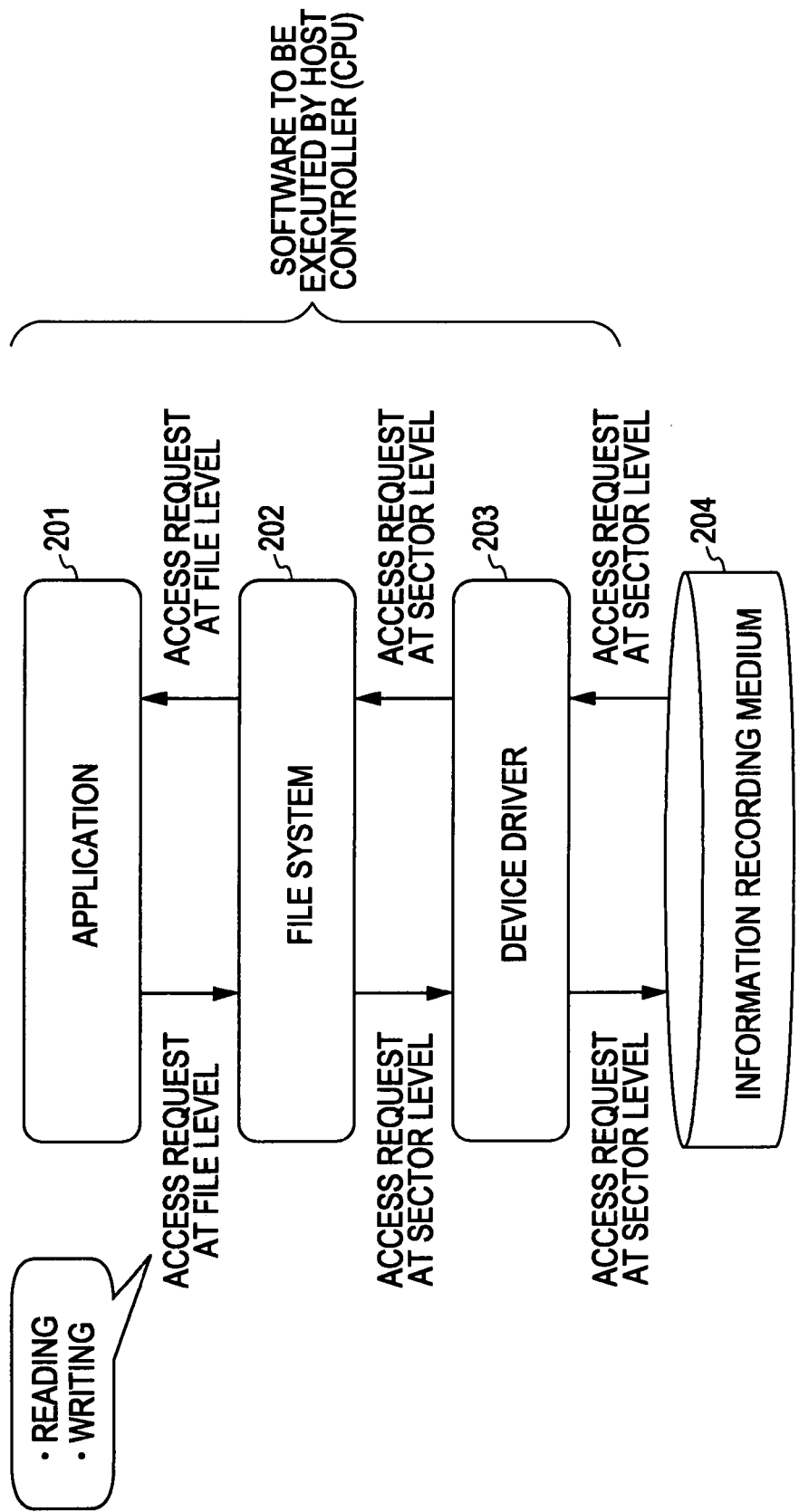
FIG. 8 illustrates a system configuration of an information processing apparatus in accordance with one embodiment of the present invention.

As shown in FIG. 8, for example, data is recorded on an information recording medium 204 such as a hard disk, or data is read from the information recording medium 204. A file system (file management program) 202 for managing a file on the information recording medium 204 and a device driver 203 for controlling the information recording medium 204 in accordance with information from the file system are present under an application program 201 serving as a channel of contact with a user.

To record data on the information recording medium 204 or to reproduce data from the information recording medium 204, a data writing and data reproducing process is performed using a function of the device driver 203. In the same manner as in the known system, that process is performed by a combination of the file system, device driver, and recording medium (hard disk) that interact each other.

When a plurality of different files is used as a continuously recorded file in the data recording process, a special code for the file allocation table (FAT) used by the file system is recorded. When a plurality of different files is used as a continuously recorded file in the data reproducing process, file switching is executed on condition that the special code is detected from the FAT.

Figure 9:
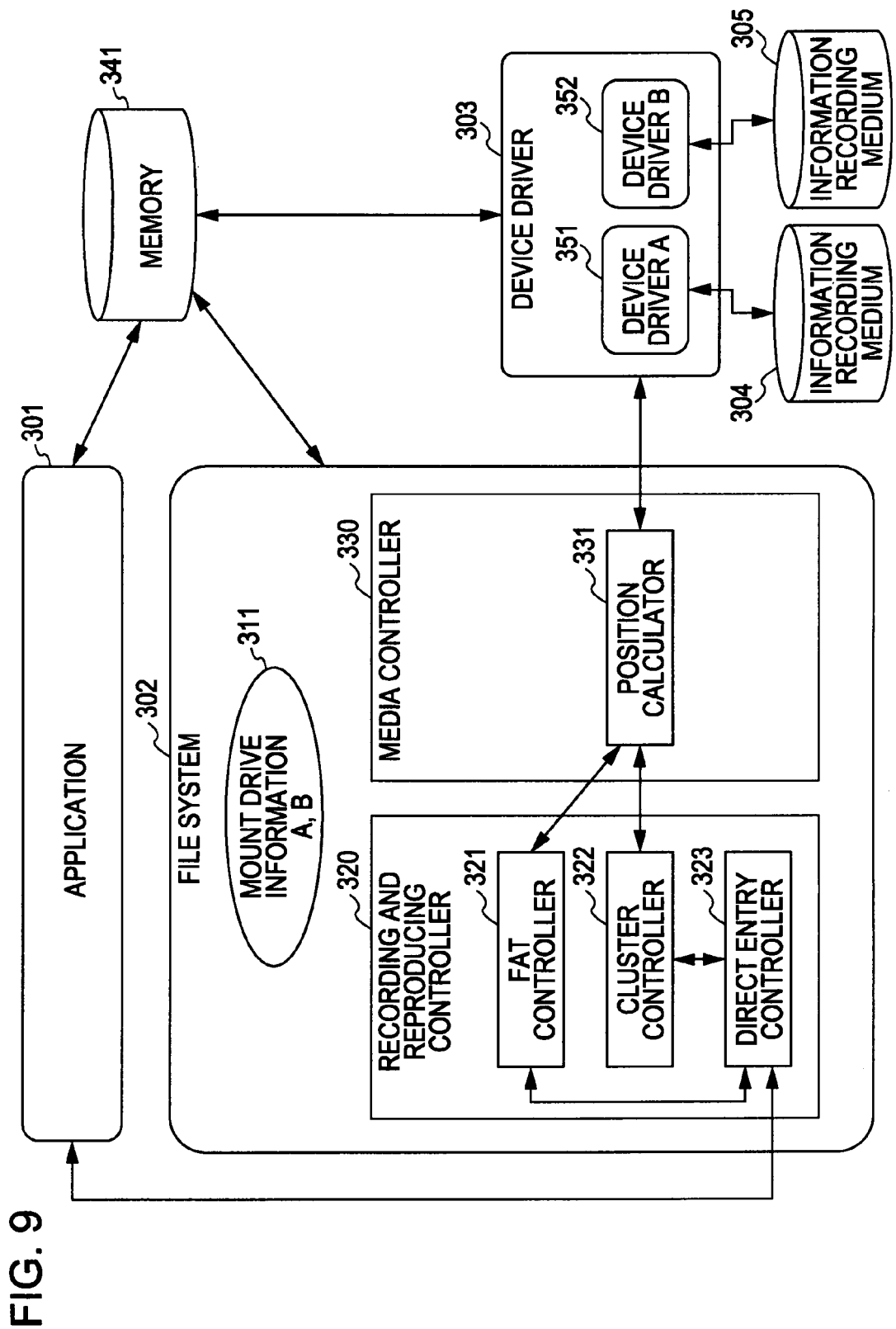
FIG. 9 illustrates a system configuration of an information processing apparatus in accordance with one embodiment of the present invention.

FIG. 9 illustrates more in detail the file system in the system configuration of FIG. 8. Like FIG. 8, FIG. 9 shows the system configuration of the information processing apparatus that performs the data recording process on the information recording medium, and the data acquisition and reproducing process on the information recording medium. Data is thus recorded on an information recording medium 304 such as a hard disk, or data is read from the information recording medium 304 and then used.

An information recording medium 305 is a flash memory, for example. In accordance with the present embodiment, real data such as master file management information and pickup image data is recorded on the information recording medium 304, and the information recording medium 305 made up of the flash memory serves as a recording area for the backup data of the file management information. Alternatively, the recording area of the backup data of the file management information may be the information recording medium 304 such as a hard disk rather than a second recording medium such as the flash memory.

Arranged under an application program 301 serving as a channel of communication with the user as shown in FIG. 9 are a file system (file management program) 302 for managing files on the information recording media 304 and 305 and a device driver 303 for controlling the information recording mediums 304 and 305 in response to information from the file system. The device driver 303 includes a device driver A 351 and a device driver B 352 respectively for the information recording media 304 and 305 as recording devices.

Each of the application program 301, the file system 302, and the device driver 303 accesses a memory 341 that stores programs and parameters for executing a process of each elements and serves as a working area for data processing.

The file system 302 stores mount drive information A and B 311 containing the type of an information recording medium and format information. In accordance with the mount drive information A and B 311, the file system 302 performs the data recording and reproducing process to the information recording medium 304 such as the hard disk and the information recording medium 305 such as the flash memory. The file system 302 includes a recording and reproducing controller 320 for controlling the data recording and reproducing process and a media controller 330 for controlling the media.

The recording and reproducing controller 320 includes a FAT controller 321, a cluster controller 322, and a direct entry controller 323. The FAT controller 321 records and references the FAT. The cluster controller 322 determines a cluster as data recording position information, and determines a reproducing position based on a cluster number. The direct entry controller 323 generates or references a directory entry (see FIG. 3) containing information corresponding to a file. The direct entry controller 323 acquires a directory entry corresponding to a particular file in response to an instruction from the application program 301. In the case of file reproduction, the direct entry controller 323 acquires a leading cluster number from the directory entry and then supplies the leading cluster number to the cluster controller 322.

The media controller 330, including a position calculator 331, controls the device driver 303 in accordance with the cluster information determined by the cluster controller 322 and the cluster chain information of the FAT. The media controller 330 thus determines a position on the disk performing the data recording process and the data reproducing process in accordance with the cluster number. In accordance with the determined position information, the media controller 330 performs the data recording process and the data reproducing process at the position of the disk using the device driver 303.

One of the recording and reproducing controller 320 in the file system 302 and the device driver 303 records the backup management information on the non-volatile memory (recording medium) prior to the recording of the master management information on the information recording medium if the recording information is the management information such as a directory entry. After the recording of the backup management information, one of the recording and reproducing controller 320 and the device driver 303 records the master management information. More specifically, one of the file system and the device driver functions as a recording controller performing a backup process. In the recording process of the backup management information, the a position information mapping table mapping the recording destination of the backup management information to the recording destination of the master management information is recorded together with the backup management information. If information reading from the information recording medium triggers a reading error with information in the reading error being the management information such as the directory entry, the management information is read from the non-volatile recording medium. That process will be detailed later.

The information processing apparatus records, as the backup data, the directory entry, namely, the file management information to be recorded on the information recording medium by sector. More specifically, if a new data file is set or data updating is performed on data file, an addition or updating of a directory entry may be required. In such a case, the backup data of the data of the entire sector recording that directory entry is updated.

In accordance with the present embodiment, the hard disk serves as a medium recording the real data such as the master file management information and the pickup image, and the flash memory serves as a recording area recording the backup data of the file management information. A data recording sequence for these processes is described below with reference to a sequence chart of FIG. 10.

Figure 10:
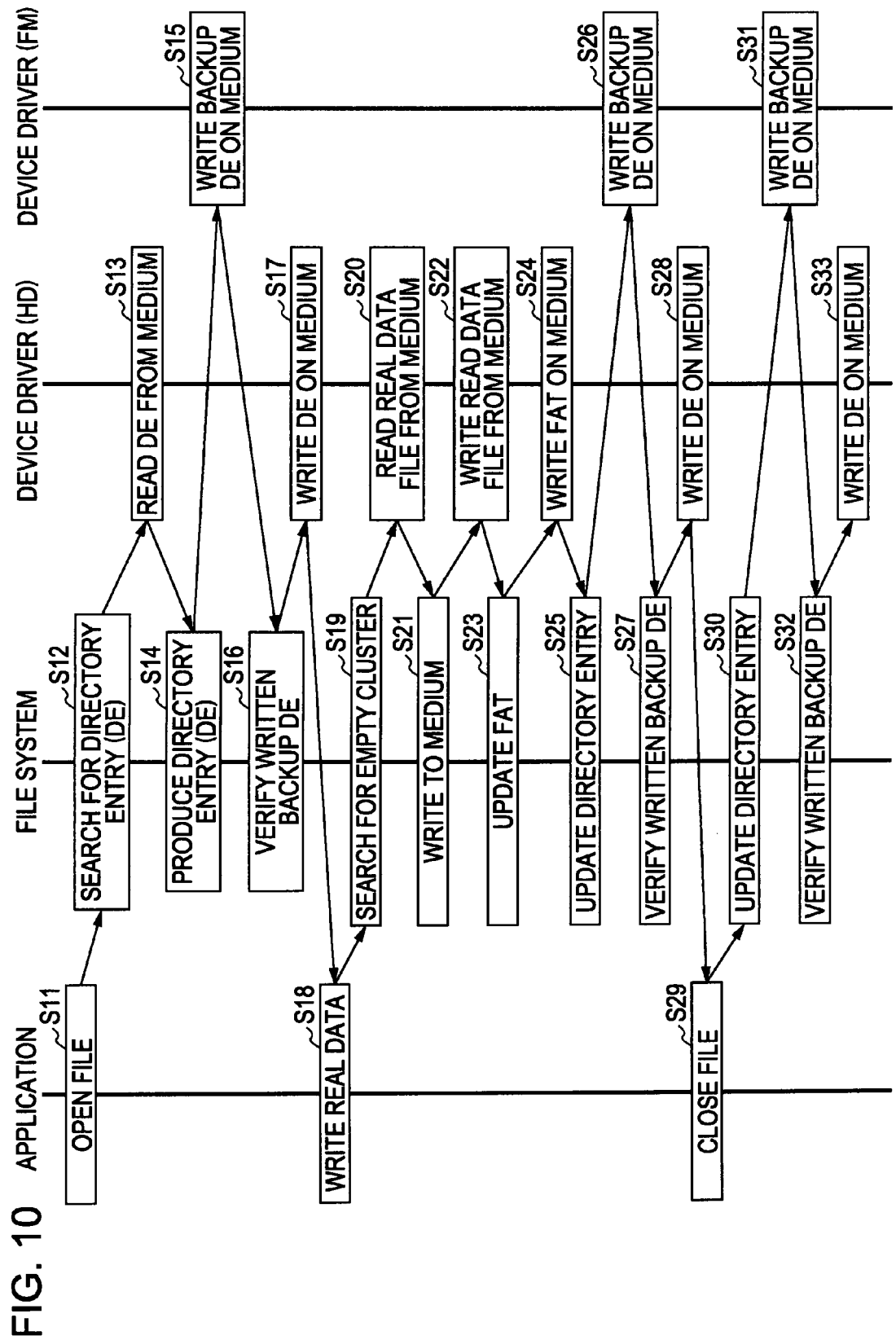
FIG. 10 illustrates an information recording sequence.

The backup process of the file management information (directory entry) may be performed in a file system driven manner or a device driver driven manner. FIG. 10 illustrates a process sequence of the backup process of the file management information (directory entry) driven by the file system.

An application program executing the information recording process opens a file for data recording in the hard disk in step S11. In response to an open file instruction, the file system starts searching for a directory entry (DE) as the file management information. For example, the file to be opened is /DCIM/101MSDCF/DSC09999.JPG.

The file system determines a writing position of the file in response to the open file command. The file system searches for a directory entry for the file management information of the file /DCIM/101MSDCF/DSC09999.JPG or, if that file is a new file, file management information for the immediately prior file /DCIM/101MSCDF/DSC09998.JPG. The device driver supporting the hard disk reads the directory entry from the medium (hard disk) in step S13.

In step S14, the file system references the read directory entry and creates a directory entry for a new file [/DCIM/101MSDCF/DSC09999.JPG]. The directory entry has the structure previously discussed with reference to FIG. 3, and contains at least access information of real data, i.e., the leading cluster number as address information.

The directory entry generated as the file management information by the file system in step S14 is written on the flash memory (FM) by the device driver supporting the flash memory in step S15. This is the writing process of the backup data of the directory entry. In step S16, the file system outputs a write command to write the directory entry to the device driver supporting the hard disk after verifying the completion of the backup directory entry. In step S17, the device driver supporting the hard disk writes the directory entry.

In step S18, the application program starts writing real data on the opened file. For example, this process corresponds to the writing process of the pickup image data on the camera. In step S19, the file system searches for an empty cluster that allows data to be written thereon. In step S20, the device driver (HD) reads the real data file with the empty cluster set for a recording destination. In step S21, the file system writes the data on the medium. In step S22, the device driver (HD) actually writes the real data on the medium (HD).

With the data written, the FAT discussed with reference to FIG. 4 needs to be updated. The file system updates the FAT in step S23. In step S24, the device driver (HD) writes the updated FAT on the medium (HD).

After the real data is written on the medium and the FAT is updated, the directory entry as the file management information needs to be updated. In step S25, the file system updates the directory entry (see FIG. 3). In step S26, the file system causes the device driver (FM) to write the backup data of the directory entry on the flash memory (FM).

After verifying in step S27 that the writing of the backup directory entry (DE) has been completed, the file system issues a command to write the directory entry to the device driver (HD) supporting the hard disk. In step S28, the device driver (HD) supporting the hard disk writes the directory entry.

In step S29, the application program closes the file. In step S30, the file system performs a final update process on the directory entry. In step S31, the device driver (FM) supporting the flash memory writes the final updated directory entry on the flash memory.

In step S32, the file system verifies that the writing of the backup directory entry has been completed, and issues a command to write the directory entry to the device driver (HD) supporting the hard disk. In step S33, the device driver (HD) supporting the hard disk writes the directory entry.

As previously discussed, the backup process of the file management information (directory entry) is performed in a file system driven manner or in a device driver driven manner. More specifically, the backup process of the file management information is performed in a manner (A) or a manner (B).

(A) Backup Process Under the Control of the File System

At the point of issuing a write instruction to the device driver, the directory entry is backed up.

(B) Backup Process Under the Control of the Device Driver

The writing of the directory entry is determined based on the content and pattern in a write instruction arriving from the file system, and then the directory entry is backed up.

When the backup process (A) is performed under the control of the file system, the file system determines whether the recording data to the information recording medium is the file management information. If it is determined that the recording data is the file management information, the file system performs the backup process. That determination process is performed in the following sequence.

The file system checks the data to be recorded on the information recording medium from the following process conditions:

Condition 1: The directory entry needs to be written on the medium because the file size or timestamp changes because of production of a new file or recording on a file;

Condition 2: The type of recording data is a directory entry;

Condition 3: The type of recording data is a management file; and

Condition 4: The type of recording data is a content file such as a moving image or a still image.

The file system checks the data from the above-mentioned conditions and determines whether to back up the recording data based on the determination as to whether any of the following conditions A1-A3 is satisfied or not:

A1: {(Condition 1 is true) and (Condition 2 is true)} or
A2: {(Condition 1 is true) and (Condition 3 is true)} or
A3: {(Condition 1 is true) and (Condition 4 is true)}.

If any of the conditions A1-A3 is satisfied, the file system determines that the recording information is the file management information (directory entry), and then performs the backup process. The backup process is performed by sector, wherein the sector is a recording unit on the recording medium as the recording destination of the master management information.

When the backup process (B) is performed under the control of the device driver, the device driver determines whether the recording data to be recorded on the information recording medium is the file management information. If it is determined that the recording data is the file management information, the device driver performs the backup process. That determination process is performed under the following sequence.

The device driver checks the data to be recorded on the information recording medium from the following process conditions:

Condition 1: The data writing is to be performed on the medium with the file opened;

Condition 2: The data writing is to be performed on the medium subsequent to writing to the medium for FAT updating;

Condition 3: The data writing is to be performed on the medium in which a write size (by sector) on the medium is specified as a predetermined number of sectors (one sector, for example); and Condition 4: The data writing is to be performed on the medium to within a predetermined sector range.

After checking those conditions, the device driver determines whether to back up the recording data based on the determination as to whether any of the following conditions B1-B4 is satisfied:

B1: {(Condition 1 is true) and (Condition 3 is true)} or
B2: {(Condition 2 is true) and (Condition 3 is true)} or
B3: {(Condition 2 is true) and (Condition 4 is true)} or
B4: {(Condition 3 is true) and (Condition 4 is true)}.

If any of the conditions B1-B4 is satisfied, the device driver determines that the recording information is the file management information (directory entry), and then performs the backup process. The backup process is performed by sector, wherein the sector is a recording unit on the recording medium as the recording destination of the master management information.

The conditions B1-B4 are premised on the following processes:

Condition B1 is premised on the recording of a file such as a moving image, a still image or management information.

Condition B2 is premised on the recording of a file such as a moving image, a still image or management information or a new recording of a directory.

Condition B3 is premised on the case that a sector range of a recording destination such as a management information file or a directory can be identified.

Condition B4 is premised on the case that a sector range of a recording destination such as a management information file or a directory can be identified.

The structure of data to be recorded on the flash memory is described below with reference to FIG. 11. The flash memory records not only the data corresponding to the directory entry discussed with reference to FIG. 3 but also recording position information (logical block address (LBA)) on a main recording medium (hard disk) of backup data and backup data recording position information (LBA) on a sub recording medium (flash memory) as a medium for backup data.

Figure 11B:
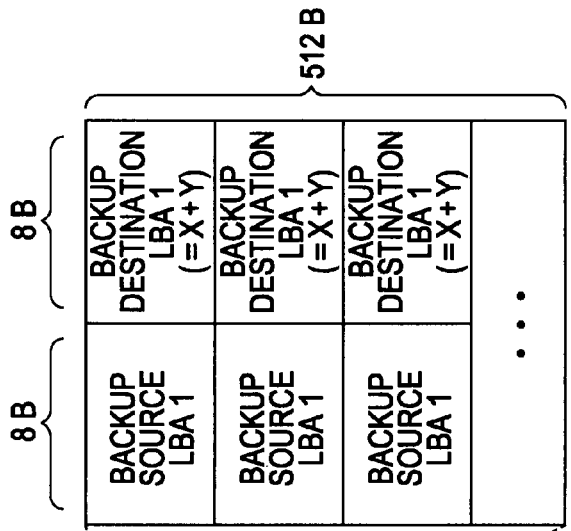
FIGS. 11A, 11B and 11C illustrate the arrangement of data to be recorded as backup data.
Figure 11C:
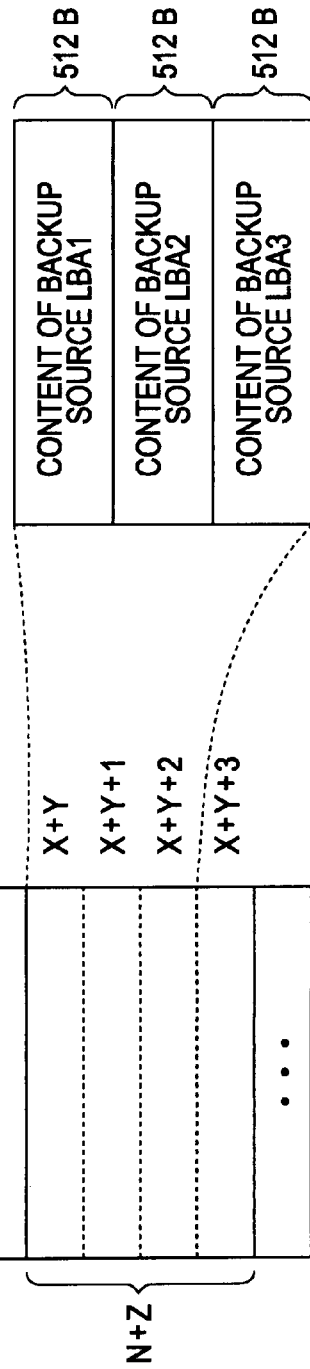
Figure 11A:
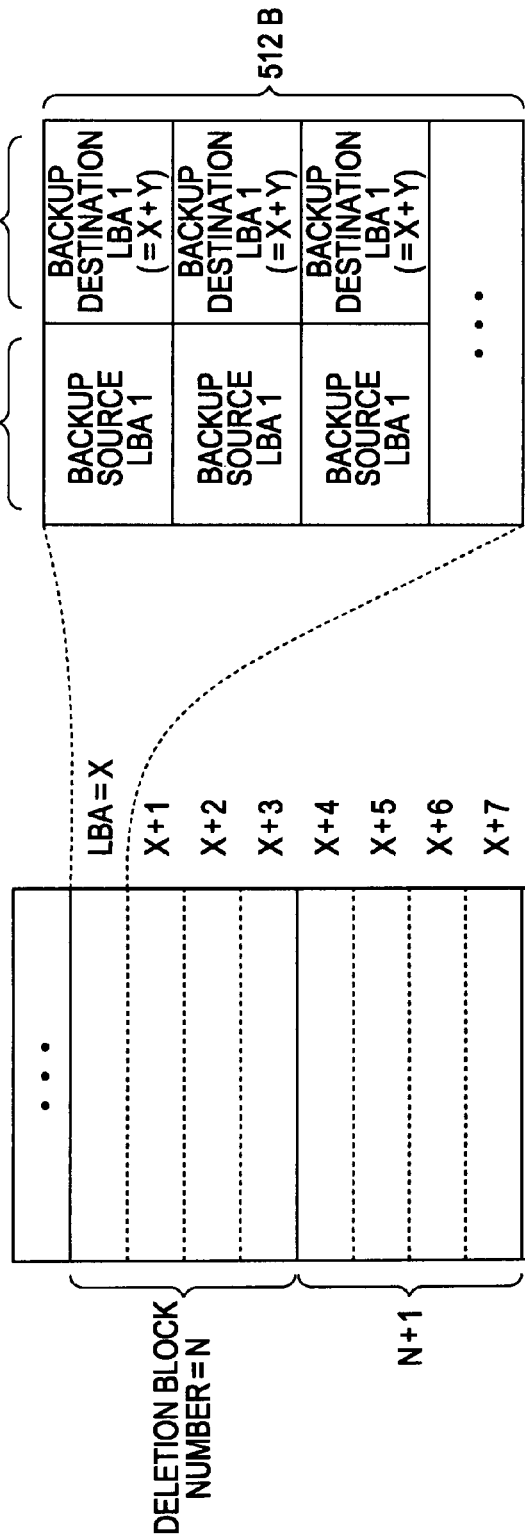

The structure of the flash memory recording the backup data is shown in FIG. 11A. FIG. 11B shows the structure of mapping data between the recording position information (logical block address (LBA)) on the main recording medium (hard disk) of the backup data and the backup data recording position information (LBA) on the sub recording medium (flash memory) as the medium for the backup data. Backup source LBAn is the recording position information (LBA) on the main recording medium (such as the hard disk). Backup destination LBAn is the backup data recording position information (LBA) of the sub recording medium (flash memory) as the medium for the backup data.

FIG. 11C illustrates data of directory entry information as real file management information, namely, information of the directory entry discussed with reference to FIG. 3. The flash memory thus records the mapping table mapping the directory entry as the backup data and the recording position information of the master directory entry to the recording position information of the backup directory entry. In the sequence chart of FIG. 10, information writing (including information updating) is performed in steps S15, S26, and S31.

The recording of all information is performed by sector as a data recording unit on the hard disk. When one directory entry is updated, all directory entries contained in the sector recording that directory entry are temporarily read on a RAM for updating process, and then recorded on the flash memory as the backup data. Furthermore, the directory entries are recorded on the hard disk as the master backup data.

Figure 12:
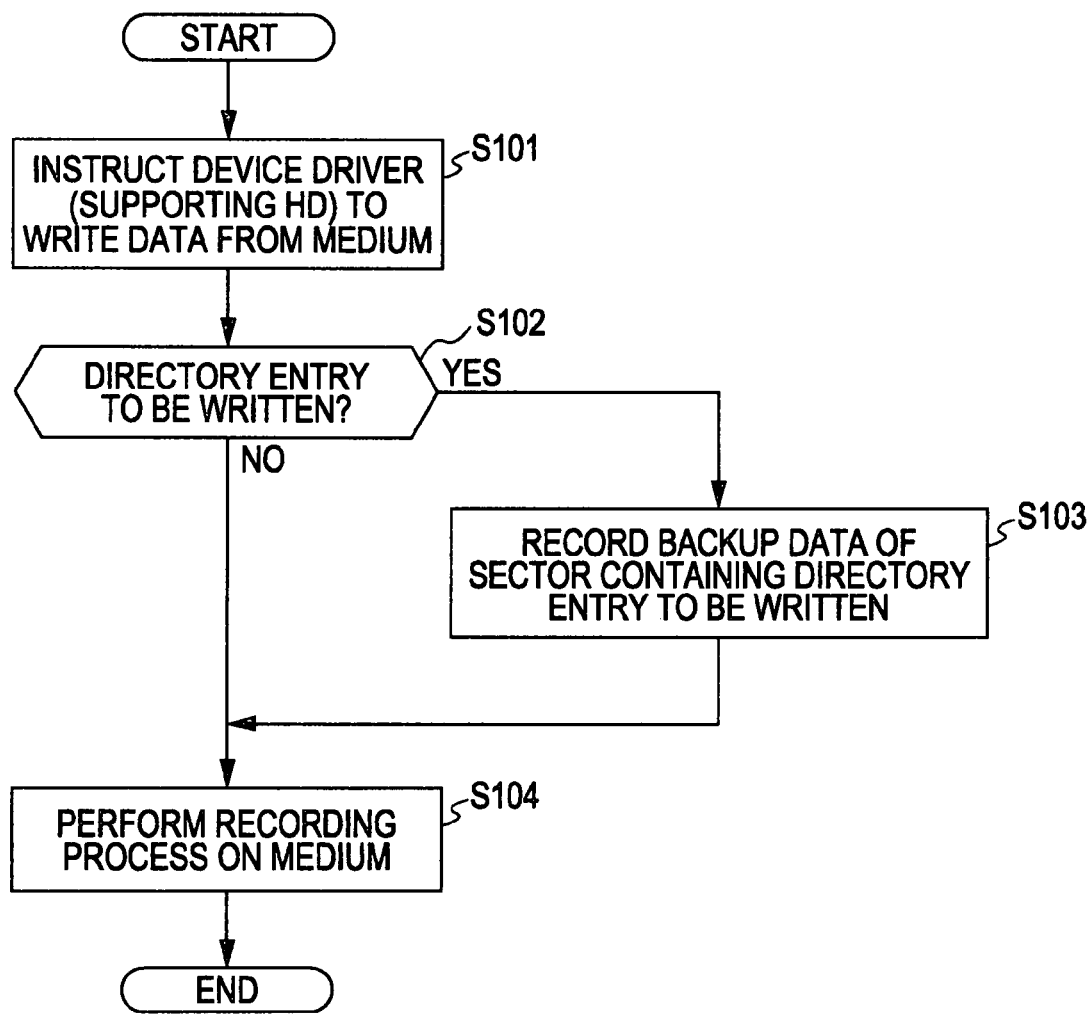
FIG. 12 is a flowchart illustrating the information recording sequence in the information processing apparatus.

The process sequence of the data recording process on the media is described below with reference to a flowchart of FIG. 12. In step S101, the file system instructs the device driver (HD) supporting the main medium (hard disk) executing the real data recording process to write the data on that recording medium.

In step S102, the file system determines whether the recording data is a directory entry as the file management information. If it is determined in step S102 that the recording data is not the directory entry, processing proceeds to step S104. The file system writes the data on the hard disk and completes the process.

If it is determined in step S102 that the recording data is the directory entry as the file management information, processing proceeds to step S103. The file system records the entire data of one sector, as a recording area containing the directory entry to be recorded, on the sub medium (such as the flash memory). In this case, the recording information contains not only the directory entry information but also the mapping table of the recording position information (LBA) of the directory entry between the main medium and the sub medium as previously discussed with reference to FIGS. 11A and 11B.

In step S103, the file system records the backup data. In step S104, the master file management information (directory entry) is recorded on the main medium (hard disk).

Figure 13:
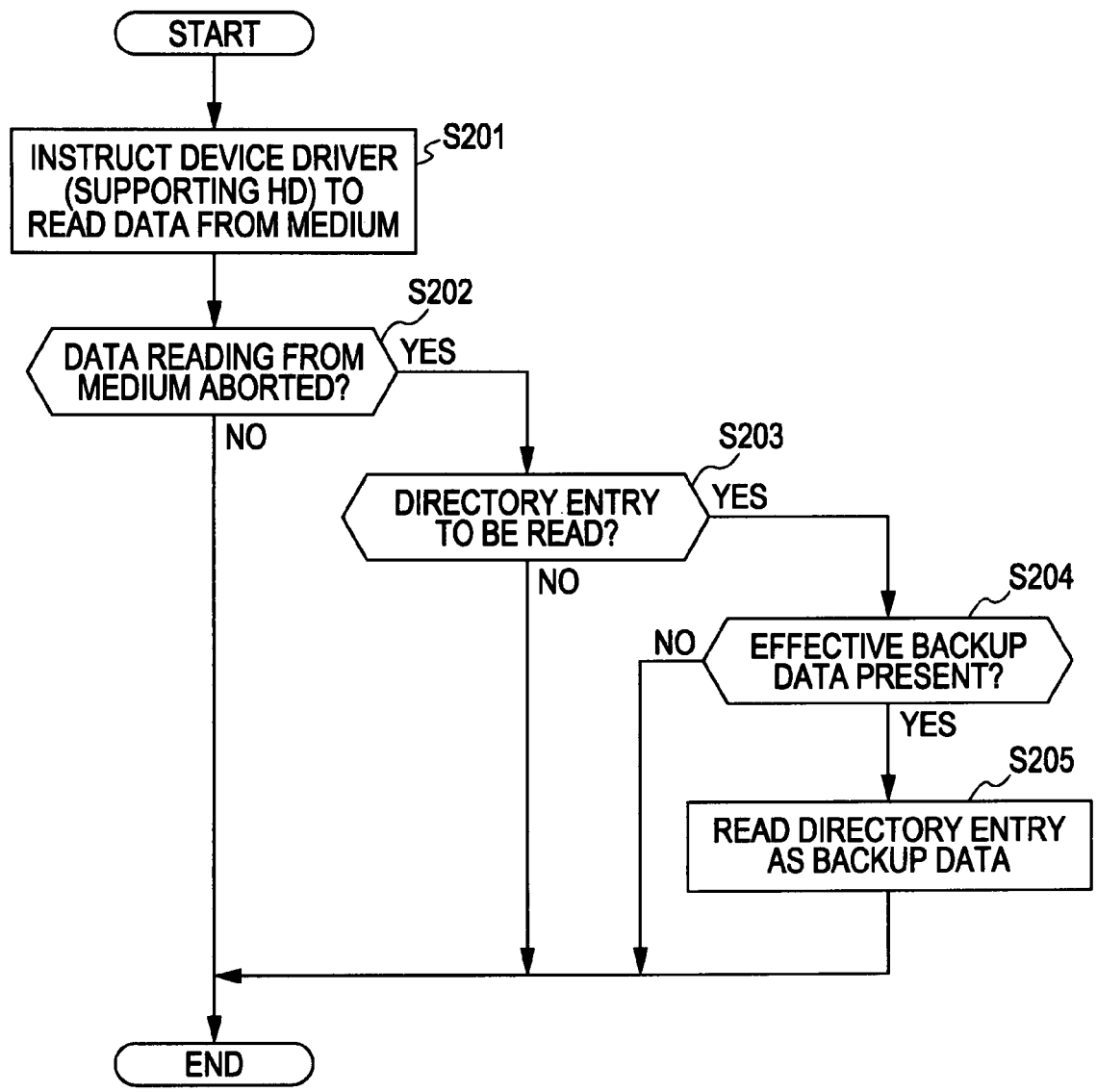
FIG. 13 is a flowchart illustrating an information reading sequence in the information processing apparatus in accordance with one embodiment of the present invention.

The process sequence of the data reproducing process for reproducing data from the medium is described below with reference to a flowchart of FIG. 13. During data reproduction, the file management information (directory entry) needs to be read and analyzed first in order to acquire access destination information of the real data of a file from which the reading process is to be performed. When the reading of the file management information (directory entry) recorded on the main information recording medium is aborted, the information processing apparatus of one embodiment of the present invention reads the backed up file management information (directory entry) to achieve reliable access.

In step S201, the file system instructs the device driver supporting the hard disk as the main recording medium to read the data from the medium (hard disk). In step S202, the file system determines whether the data reading from the medium has been successful. If it is determined in step S202 that the data reading has been successful, processing ends. If it is determined in step S202 that the data reading has been aborted, the file system determines in step S203 whether the data reading process has been a directory entry reading process. If it is determined in step S203 that the data reading process has not been a directory entry reading process, processing ends. In this case, a real data reading error occurs, and a re-reading process might be performed in response to an instruction from the application or the user.

If it is determined in step S203 that the data reading process is a directory entry reading process, processing proceeds to step S204. The file system determines whether effective backup data is present. In this determination step, the file system references the position information mapping table of the medium recording the backup data (for example, the flash memory), i.e., references the mapping table of the addresses (LBAS) of the backup source and the backup destination shown in FIG. 11B, thereby determining whether the reading address (LBA) of the directory entry as the data to be read is recorded as the backup source address (LBA) of the position information mapping table.

If the reading address (LBA) of the directory entry as the data to be read is recorded as the backup source address (LBA) of the position information mapping table, the answer to the determination in step S204 is yes. In step S205, the file system reads the directory entry as the backup data.

The backup destination address (LBA) corresponding to the backup source address (LBA) of the position information mapping table is acquired. The file system accesses the backup destination address (LBA), thereby reading the directory entry recorded at the access destination.

Even if the reading of the file management information (directory entry) recorded on the main information recording medium is aborted, the information processing apparatus of one embodiment of the present invention reads the backed up file management information (directory entry), thereby reliably accessing the directory entry.

Figure 14:
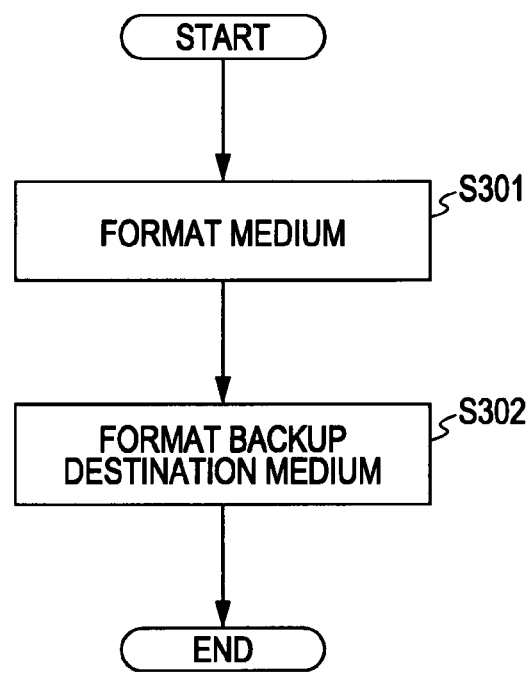
FIG. 14 is a flowchart illustrating a recording medium format sequence in the information processing apparatus in accordance with one embodiment of the present invention.

A format sequence of the media performed by the information processing apparatus of one embodiment of the present invention is described below with reference to FIG. 14. The information processing apparatus in accordance with one embodiment of the present invention includes the (main) recording medium for the real data and the master file management information (directory entry) and the (sub) recording medium for the backup data for the file management information (directory entry), and thus formats these media.

The information processing apparatus formats the main recording medium for the real data and the master file management information (directory entry) in step S301 and formats the sub recording medium for the backup data of the file management information (directory entry) in step S302. Through these steps, medium formatting is completed.

In the preceding embodiments, the backup data of the file management information (directory entry) is recorded on the medium such as the flash memory and is not periodically deleted. If it is determined that the master file management information (directory entry) has been successfully recorded on the main medium, the file management information (directory entry) as the backup data recorded on the medium such as the flash memory may be deleted in one process. This process is described below.

The process to be described below is identical to the above-referenced process in that the master file management information (directory entry) is recorded on the main medium such as the hard disk after the file management information (directory entry) is backed up on the sub medium such as the flash memory. As soon the master file management information (directory entry) is successfully recorded, the backup data is deleted in the process to be discussed below. Furthermore, a flag indicating whether the recording of the master file management information (directory entry) has been successfully completed is set up.

For example, if a power switch of the apparatus is turned off prior to the completion of the recording of the master file management information (directory entry), the backup data is recorded on the flash memory. When the power switch is turned on again, the setting of the flag is examined, and the recording of the master file management information (directory entry) is performed using the backup data.

Figure 15:
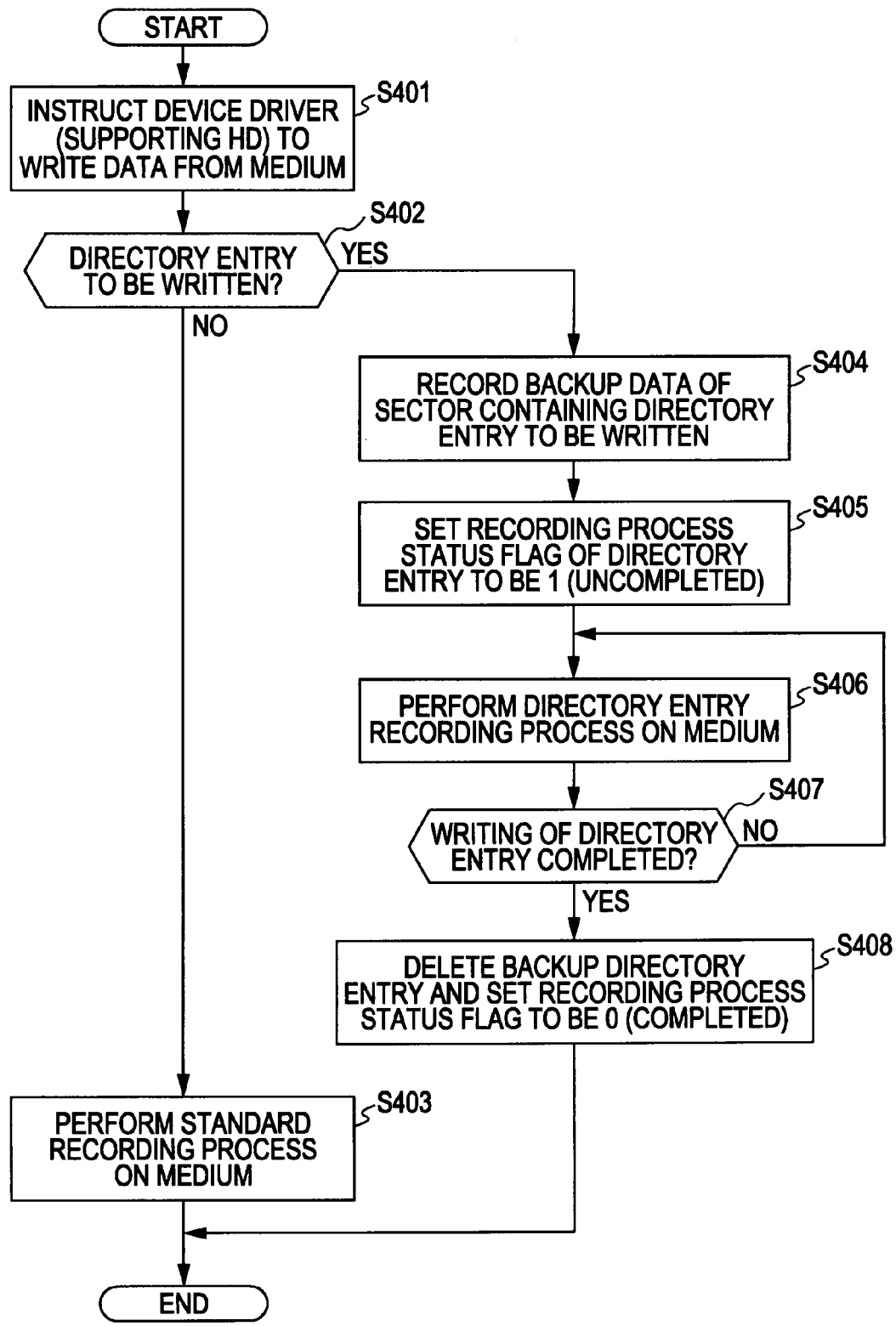
FIG. 15 is a flowchart illustrating an information recording sequence in the information processing apparatus in accordance with one embodiment of the present invention.

A data recording sequence in this process is described below with reference to a flowchart of FIG. 15.

In step S401, the file system instructs the device driver supporting the main recording medium (hard disk) recording the real data to record the data thereon. In step S402, the file system determines whether the recording data is a directory entry as the file management information. If it is determined in step S402 that the recording data is not a directory entry, processing proceeds to step S403. The file system records the data on the medium (hard disk), and ends the process.

If it is determined in step S402 that the recording data is a directory entry as the file management information, processing proceeds to step S404. The file system records on the sub medium (for example, the flash memory) all data of one sector as a recording area containing the directory entry to be recorded as the backup data. As previously discussed with reference to FIGS. 11A and 11B, the recording information contains not only the directory entry information but also the mapping table of the recording position information (LBAS) of the directory entries in the main medium and the sub medium.

In step S404, the recording of the backup data is completed. In step S405, the file system sets a recording process status flag of the directory entry to a value indicating an uncompleted process (flag value=1). The flag may be recorded on the non-volatile recording medium, such as the flash memory. In step S406, the master file management information (directory entry) is recorded on the main medium (hard disk).

If it is determined in step S407 that the writing of the master file management information (directory entry) on the maim medium (hard disk) has been successful, the file system deletes the backup data on the sub medium in step S408. The file system updates the recording process status flag of the directory entry to a value indicating a completed process (flag value=0), thereby ending the process. When the backup data is deleted, the entry of the position information mapping table (see FIG. 11B) is also deleted.

The user might switch off the apparatus in the middle of the writing process of the master file management information (directory entry) on the main medium (hard disk). In such a case, the recording process status flag of the directory entry remains unchanged from the value indicating an uncompleted process (flag value=1).

Figure 16:
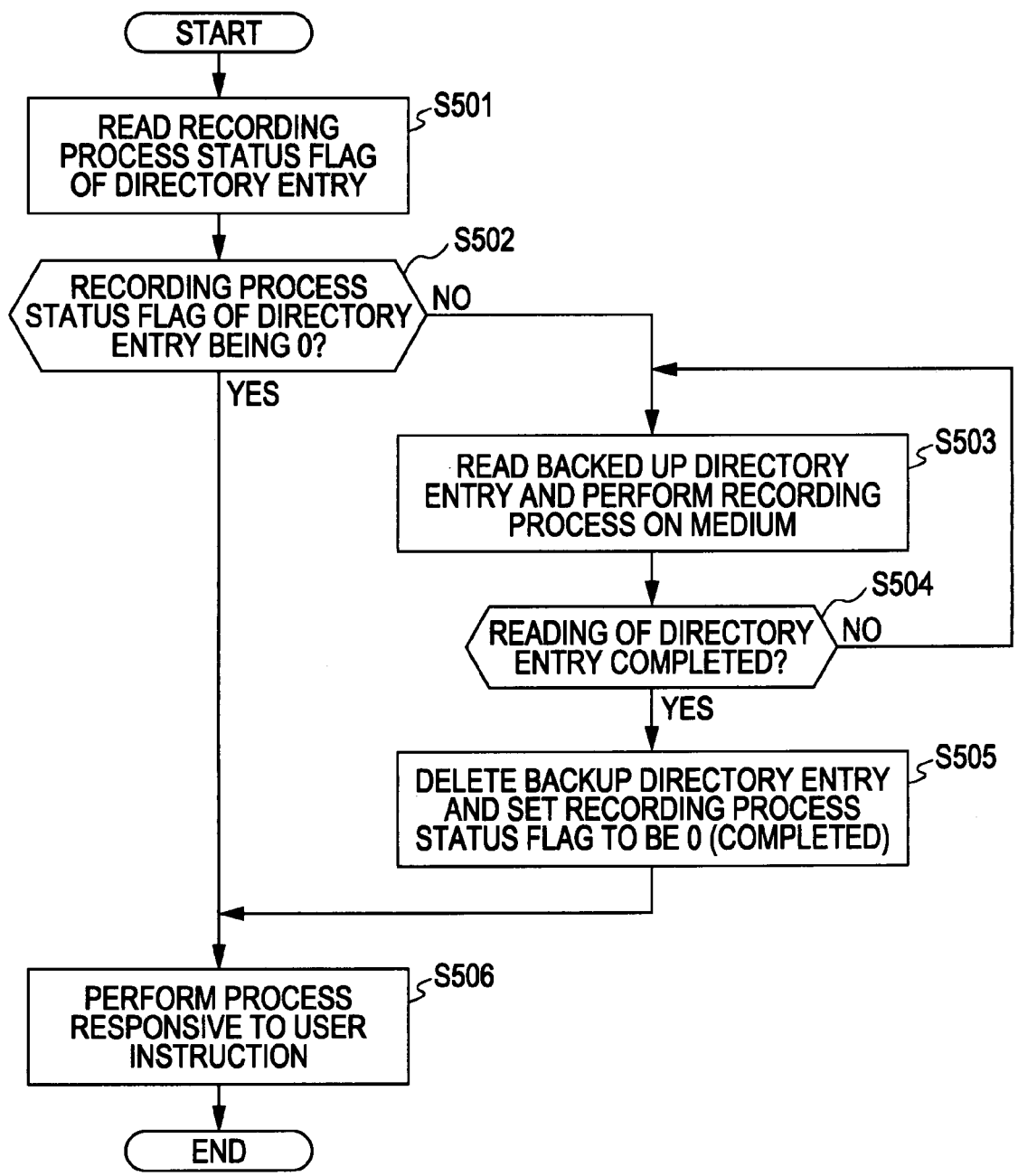
FIG. 16 is a flowchart illustrating a startup sequence in the information processing apparatus in accordance with one embodiment of the present invention.

A startup sequence of the information processing apparatus is described below with reference to a flowchart of FIG. 16. The information processing apparatus of one embodiment of the present invention checks the recording process status flag of the directory entry at the startup thereof, thereby determining whether the writing process of the master file management information (directory entry) on the main medium (hard disk) has been completed. If it is determined that the writing process has not been completed, the information processing apparatus writes the master file management information (directory entry) on the main medium using the backup data recorded on the sub medium.

In step S501, the information processing apparatus at the startup thereof reads the recording process status flag of the directory entry recorded on the flash memory as the non-volatile recording medium. In step S502, the information processing apparatus determines whether the flag value is set to a value indicating a completed process (flag value=0). If the flag value indicates that the recording process of the directory entry has been completed, processing proceeds to step S506 to perform a process responsive to a user instruction.

If it is determined in step S502 that the flag value is not set to a value indicating a completed process (flag value=0), i.e., that the flag value is set to a value indicating an uncompleted process (flag value=1), processing proceeds to step S503. The information processing apparatus reads the directory entry backed up on the sub medium and then records the directory entry on the main medium. In this process, the information processing apparatus references the position information mapping table (see FIG. 11B), thereby acquiring the mapping data of the recording position information (LBA) of the corresponding entries of the main medium and the sub medium. The information processing apparatus reads the backup data of the unprocessed directory entry based on the backup destination LBA, identifies the directory entry recording destination in the main medium based on the backup source LBA, and records the read directory entry data on the recording destination.

Upon determining in step S504 that the recording process of the master file management information (directory entry) has been successfully completed on the main medium (hard disk), the information processing apparatus deletes the backup data recorded on the sub medium in step S505. The information processing apparatus updates the recording process status flag of the directory entry to a value indicating a completed process (flag value=0), thereby ending the process. When the backup data is deleted, the entry of the position information mapping table (see FIG. 11B) is also deleted. Processing proceeds to step S506 to perform a process responsive to a user instruction.

The information processing apparatus thus generates the backup data in the recording process of the directory entry, sets the flag indicating whether the recording process of the master directory entry has been completed, and checks the recording process status flag of the directory entry at the startup of the apparatus. The information processing apparatus then determines whether the recording process of the master file management information (directory entry) on the main medium (hard disk) has been completed. If it is determined that the recording process has not been completed, the information processing apparatus records the master file management information (directory entry) on the main medium using the backup data recorded on the sub medium. With this arrangement, even if the user switches the apparatus in the middle of recording of the master directory entry, the information processing apparatus checks the value of the flag at the restart thereof, and records the master directory entry in accordance with the backup data. The directory entry is thus prevented from being destroyed.

A digital video camera and a personal computer, as examples of the above-described information processing apparatus, are described below with reference to FIGS. 17 and 18.

The configuration of the digital video camera is described below with reference to FIG. 17. The digital video camera operates in one of an image capturing mode and a video cassette recorder (VCR) mode. In the image capturing mode, the digital video camera captures an image and records image data resulting from image capturing on one of a variety of information recording media including a magnetic disk, an optical disk, a magneto-optical disk, and a semiconductor memory via a drive 432. In the VCR mode, the digital video camera records, on the recording medium, data supplied from a video input-output unit 414, an audio input-output unit 416 or via a communication unit 431, or reproduces data recorded on the recording medium.

The image capturing modes include a moving image capturing mode and a still image capturing mode. In the moving image capturing mode, the digital video camera captures a moving image while picking up audio. In the still image capturing mode, the digital video camera captures a still image. In the VCR mode, the supplied data is recorded when an operation input unit 420 including a record button switch or the like is operated. When a playback button on the operation input unit 420 is selected, desired data recorded on the recording medium is reproduced.

Figure 17:
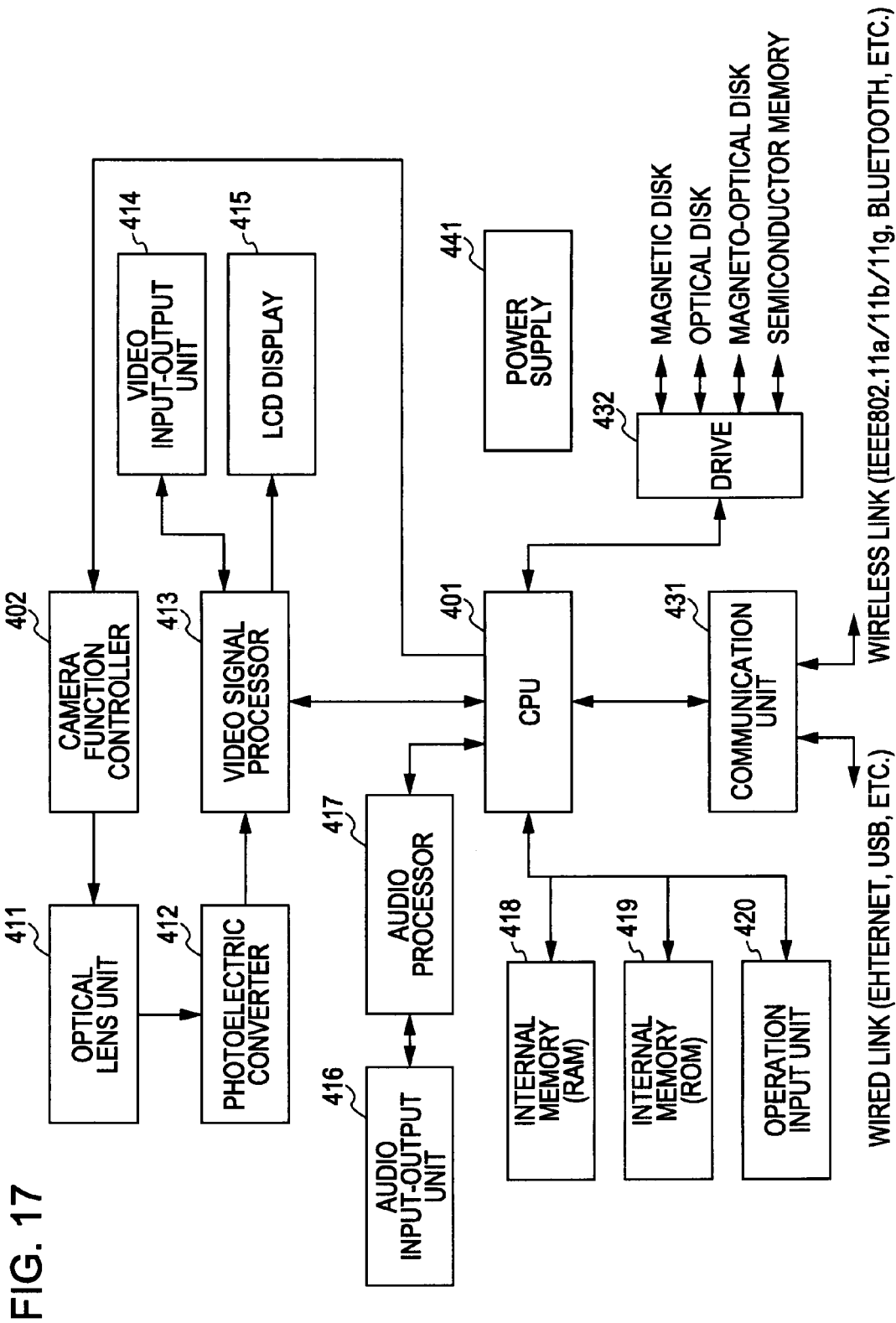
FIG. 17 illustrates a configuration of a digital video camera in accordance with one embodiment of the present invention.

As shown in FIG. 17, the digital video camera includes an optical lens 411, a photoelectric converter 412, a camera function controller 402, a video signal processor 413, the video input-output unit 414, an LCD display 415, the audio input-output unit 416, an audio processor 417, the communication unit 431, a controller (CPU) 401, an internal memory (RAM) 418, an internal memory (ROM) 419, an operation input unit 420, a drive 432 for the information recording medium, and a power supply 441 for supplying power to each elements of the digital video camera.

The CPU 401 performs processes in accordance with a variety of processing programs stored on the ROM 419. The RAM 418, mainly functioning as a working area, temporarily stores pending results of each process. During the recording process of the management information, data updating is performed on the internal memory 418.

The operation input unit 420 includes a variety of operation keys and function keys, for example, includes a mode switch key for switching between the moving image capturing mode, the still image capturing mode, and the VCR mode, a shutter key for capturing a still image, an image capture start key for capturing a moving image, a recording key, a reproducing key, a stop key, a fast-forward key, and a fast-rewind key. Upon receiving an operation input from the user, the operation input unit 420 supplies to the CPU 401 an electrical signal responsive to the user operation input.

In response to the user operation input, the CPU 401 reads from the ROM 419 a program to perform an intended process, and executes the program. By controlling each element, the CPU 401 controls the process in response to a user instruction. The digital video camera allows a variety of information recording media including a magnetic disk, an optical disk, a magneto-optical disk, and a semiconductor memory to be loaded thereon as an information recording medium. The digital video camera records a variety of information on the information recording medium via the drive 432 or reproduces information recorded on the information recording medium via the drive 432.

Figure 18:
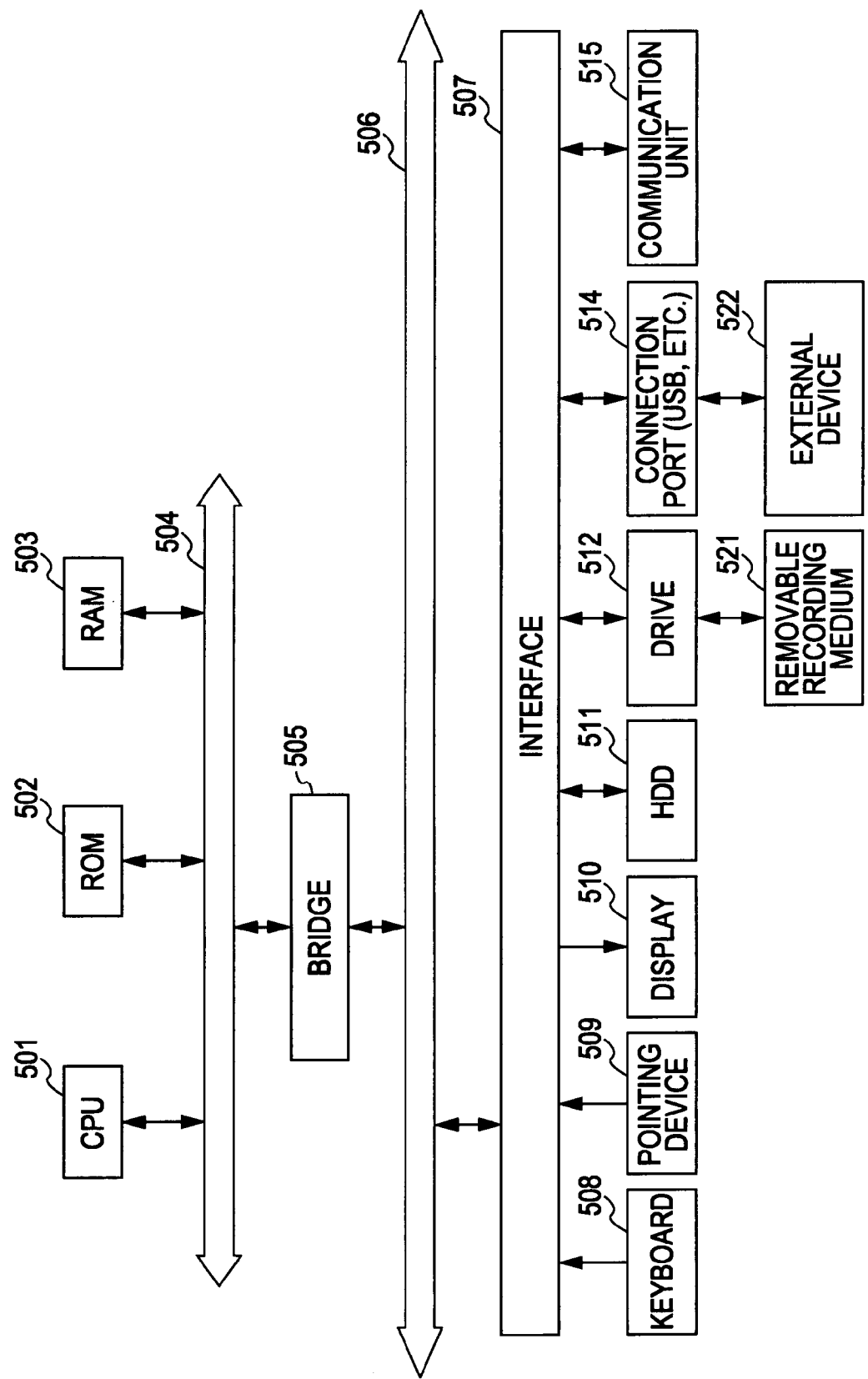
FIG. 18 illustrates a configuration of a personal computer in accordance with one embodiment of the present invention.

With reference to FIG. 18, a hardware structure of the personal computer as an example of the information processing apparatus is described. A central processing unit (CPU) 501 performs a process for an operating system (OS), and records or reproduces data using various files discussed with reference to the preceding embodiments. These processes are executed under the control of computer programs stored on a data storage such as a ROM or a hard disk on the information processing apparatus.

A read-only memory (ROM) 502 stores programs and calculation parameters used by the CPU 501. A random-access memory (RAM) 503 stores a program used by the CPU 501 and parameters varied as necessary during the execution of the program. These elements are mutually connected by a host bus 504 including a CPU bus. During the recording process of the management information, data updating is performed using the RAM 503 as a working area.

The host bus 504 is connected to an external bus 506 such as a peripheral component interconnect/interface (PCI) bus via a bridge 505.

A keyboard 508 and a pointing device 509 are input devices operated by a user. A display 510, composed of a liquid-crystal display device or a cathode ray tube (CRT), displays a variety of information in text or an image. A hard disk drive (HDD) 511, including a hard disk, records or reproduces a program to be executed by the CPU 501 or information by driving the hard disk. The hard disk is used as a storage area for a video data file, and also stores a variety of computer programs such as a data processing program.

A drive 512 reads data or a program stored on a loaded removable recording medium 521, such as a magnetic disk, an optical disk, or a semiconductor program, and supplies the read program and data to the RAM 503 via an interface 507, the external bus 506, the bridge 405, and the host bus 504.

A connection port 514, used to connect to an external device 522, includes a connection portion such as a universal serial bus (USB) or the Institute of Electrical and Electronics Engineers Standard IEEE1394 interface, etc. The connection port 514 is connected to the CPU 501 via the interface 507, the external bus 506, the bridge 405, the host bus 504, etc. A communication unit 515, connected to a network, communicates with another information processing apparatus.

The information processing apparatuses of FIGS. 17 and 18 are shown for exemplary purposes. The information processing apparatus of embodiments of the present invention is not limited the ones shown in FIGS. 17 and 18. Any information processing apparatus is acceptable as long as that information processing apparatus performs the processes described in the preceding embodiments.

The present invention is applicable to a wide range of randomly accessible media. When applied to a hard disk drive (HDD), the present invention is particularly effective. The file system is not limited to FAT16/32. In the above-described embodiments, the backup process is performed by sector. The present invention is also applicable when the backup process is performed by cluster.

In the above-described embodiments, the backup destination of the backup data is set to the non-volatile recording medium, such as the flash memory, different from the recording medium of the master recording destination. The backup destinations of the backup data may be set to the same recording medium as the master recording destination at predetermined recording areas. For example, if the master recording destination of content is the HDD, the backup data may be recorded on recording areas set at empty regions on the HDD as shown FIGS. 1A and 1B.

The flag information may be backed up on the non-volatile recording medium such as the flash memory different from the recording medium as the master recording destination. The flag information may be backed up on a predetermined recording area of the recording medium as the master recording destination.

The flag may be recorded on the non-volatile recording medium, and the other data such as the backup data may be recorded on the same recording medium as the master data but on an area different from the area where the master data is recorded. This arrangement is the most practical and advantageous in terms of costs involved and access speed.

The flag may be recorded on the non-volatile recording medium and other backup data may also be recorded non-volatile recording medium. This arrangement is costly but results in a fast startup time.

The flag may be recorded on the same recording medium as the master recording destination and the other backup data may also be recorded on the same recording medium. This arrangement reduces costs involved. Since the HDD and DVD takes longer startup time, more time is required before the flag check becomes possible.

The recording destination of the flag may be the same recording medium as the master recording destination, and the other backup data may be recorded on the non-volatile recording medium. Since the HDD and DVD takes longer startup time, more time is required before the flag check becomes possible. If a large amount of non-volatile recording medium is used, costs involved also increases.

The master recording destination may be any of a variety of recording media including a disk-like recording medium such as a hard disk and a non-volatile recording medium such as a flash memory. In the above-described embodiments, the recording medium as the master recording destination is the HDD. Alternatively, the master recording medium may be an optical disk medium such as a DVD, or a non-volatile recording medium such as a flash memory.

The present invention has been discussed with reference to the particular embodiments. It is apparent that various changes and modifications are possible to the above-described embodiments without departing from the scope of the present invention. The embodiments have been discussed for exemplary purposes only, and are not intended to limit the scope of the present invention. The appended claims should be referred to in the determination of the scope of the present invention.

The above-referenced series of process steps may be performed using hardware or software or a combination thereof. If the above-referenced series of process steps is performed using software, the program of the software may be installed from a recording medium onto a computer built in dedicated hardware or a general-purpose personal computer enabled to perform a variety of functions with a variety of programs installed thereon.

The program may be recorded beforehand on a hard disk or a ROM as a recording medium. The program may be stored temporarily or permanently on a removable recording medium such as a flexible disk, a compact disk read only memory (CD-ROM), a magneto-optical (MO) disk, a digital versatile disk (DVD), a magnetic disk, or a semiconductor memory. Such a removable disk may be supplied in so-called package software.

The program may be installed from the above-mentioned removable medium to the computer. The program is also transmitted to the computer from a download site in a wireless fashion, or transmitted to the computer in a wired fashion via a local area network (LAN) or via the Internet. The computer receives thus transferred program, and stores the program on a recording medium such as a hard disk.

The process steps described herein may be performed in the time-series order sequence as previously stated. Alternatively, the process steps may be performed in parallel or separately. In this specification, the system refers to a logical set of a plurality of apparatuses and is not limited to an apparatus that houses member elements in a single casing.

The invention claimed is:

1. An information processing apparatus, comprising:
a recording controller for controlling recording of management information containing access information corresponding to recording information for an information recording medium,
wherein the recording controller records a backup copy of the management information on a non-volatile recording medium prior to the recording of a master copy of the management information on the information recording medium, and records the master copy of the management information after recording the backup copy of the management information and after verifying completion of the recorded backup copy of the management information, and the recording controller records a position information mapping table, in which a recording destination of the master copy of the management information is mapped to a recording destination of the backup copy of the management information, upon the recording of the backup copy of the management information.

2. The information processing apparatus according to claim 1, wherein the non-volatile recording medium comprises a second information recording medium different from the information recording medium as the recording destination of the master copy of the management information, and wherein the recording controller controls a recording process on device drivers supporting a plurality of recording media, thereby recording the backup copy of the management information and the master copy of the management information.

3. The information processing apparatus according to claim 2, wherein the second information recording medium as the recording destination of the backup copy of the management information comprises a flash memory, and wherein the recording controller records on the flash memory the position information mapping table mapping the recording destination of the master copy of the management information to the recording destination of the backup copy of the management information.

4. The information processing apparatus according to claim 1, wherein the non-volatile recording medium is the same recording medium as the information recording medium as the recording destination of the master copy of the management information, and wherein the recording controller controls a recording process on a device driver supporting a single information recording medium, thereby recording the backup copy of the management information and the master copy of the management information on different recording areas of the single information recording medium.

5. The information processing apparatus according to claim 4, wherein the backup copy of the management information is recorded in an empty area of a file system recorded on the information recording medium.

6. The information processing apparatus according to claim 1, wherein the recording controller records on the non-volatile recording medium a flag indicating whether the recording of the master copy of the management information has been completed, and updates a value set in the flag on condition that the recording of the master copy of the management information has been completed.

7. The information processing apparatus according to claim 6, wherein the recording controller checks, at the startup of the information processing apparatus, the value of the flag recorded on the non-volatile recording medium, reads the backup copy of the management information recorded on the non-volatile recording medium if the value of the flag indicates an uncompleted recording of the master copy of the management information, and records the read backup copy of the management information as the master copy of the management information on the information recording medium.

8. The information processing apparatus according to claim 7, wherein the recording controller determines the recording destination of the master copy of the management information for the information recording medium based on the position information mapping table recorded on the non-volatile recording medium.

9. The information processing apparatus according to claim 1, wherein the recording controller records the backup copy of the management information on the non-volatile recording medium by sector, each sector being set on the information recording medium as the recording destination of the master copy of the management information.

10. The information processing apparatus according to claim 1, wherein a recording process of the backup copy of the management information in the recording controller is performed by one of a file system and a device driver, and wherein the one of the file system and the device driver determines whether the backup copy of the management information recording process satisfies a predetermined process condition, and records the backup copy of the management information if the backup copy of the management information recording process satisfies the predetermined process condition.

11. The information processing apparatus according to claim 1, further comprising a reproducing controller for reading information from the information recording medium, wherein the reproducing controller reads the management information from the non-volatile recording medium if the information reading from the information recording medium results in an reading error and if information in the reading error is the management information.

12. The information processing apparatus according to claim 3, further comprising:
 a reproducing controller for reading information from the information recording medium,
 wherein when the management information is read from the information recording medium, the reproducing controller determines based on the position information mapping table stored on the flash memory whether the backup copy of the management information corresponding to the management information in a reading error is recorded, and reads the backup copy of the management information from the flash memory based on address information recorded in the position information mapping table if the backup copy of the management information is recorded based on the position information mapping table.

13. An information processing method, comprising:
 a step of controlling recording of management information containing access information corresponding to recording information for an information recording medium,
 wherein the step of controlling the recording of the management information includes (a) recording a backup copy of the management information on a non-volatile recording medium prior to the recording of a master copy of the management information on the information recording medium, (b) recording the master copy of the management information after recording the backup copy of the management information and after verifying completion of the recorded backup copy of the management information, and (c) recording, upon the recording of the backup copy of the management information, a position information mapping table in which a recording destination of the master copy of the management information is mapped to a recording destination of the backup copy of the management information.

14. The information processing method according to claim 13, wherein the non-volatile recording medium comprises a second information recording medium different from the information recording medium as the recording destination of the master copy of the management information, and wherein the step of controlling the recording of the management information includes controlling a recording process on device drivers supporting a plurality of recording media, and thereby recording the backup copy of the management information and the master copy of the management information.

15. The information processing method according to claim 14, wherein the second information recording medium as the recording destination of the backup copy of the management information comprises a flash memory, and wherein the step of controlling the recording of the management information includes recording on the flash memory the position information mapping table mapping the recording destination of the master copy of the management information to the recording destination of the backup copy of the management information.

16. The information processing method according to claim 13, wherein the non-volatile recording medium is the same recording medium as the information recording medium as the recording destination of the master copy of the management information, and wherein the step of controlling the recording of the management information includes controlling a recording process on a device driver supporting a single information recording medium, and thereby recording the backup copy of the management information and the master copy of the management information on different recording areas of the single information recording medium.

17. The information processing method according to claim 13, further comprising steps of recording on the non-volatile recording medium a flag indicating whether the recording of the master copy of the management information has been completed, and updating a value set in the flag on condition that the recording of the master copy of the management information has been completed.

18. The information processing method according to claim 17, further comprising steps of checking, at the startup of the information processing apparatus, the value of the flag recorded on the non-volatile recording medium, reading the backup copy of the management information recorded on the non-volatile recording medium if the value of the flag indicates an uncompleted recording of the master copy of the management information, and recording the read backup copy of the management information as the master copy of the management information on the information recording medium.

19. The information processing method according to claim 18, further comprising determining the recording destination of the master copy of the management information for the information recording medium based on the position information mapping table recorded on the non-volatile recording medium.

20. The information processing method according to claim 13, wherein the step of controlling the recording of the management information comprises recording the backup copy of the management information on the non-volatile recording medium by sector, each sector being set on the information recording medium as the recording destination of the master copy of the management information.

21. The information processing method according to claim 13, wherein a recording process of the backup copy of the management information in the recording controller is performed by one of a file system and a device driver, and wherein the one of the file system and the device driver determines whether the backup copy of the management information recording process satisfies a predetermined process condition, and records the backup copy of the management information if the backup copy of the management information recording process satisfies the predetermined process condition.

22. The information processing method according to claim 13, further comprising a step of reading information from the information recording medium, wherein the step of reading the information includes reading the management information from the non-volatile recording medium if the information reading from the information recording medium results in an reading error and if information in the reading error is the management information.

23. The information processing method according to claim 15, further comprising:
a step of reading information from the information recording medium, wherein the step of reading the information includes determining based on the position information mapping table stored on the flash memory whether the backup copy of the management information corresponding to the management information in the reading error is recorded when the management information is read from the information recording medium, and reading the backup copy of the management information from the flash memory based on address information recorded in the position information mapping table if the backup copy of the management information is recorded based on the position information mapping table.

24. A processor encoded with a computer program for causing an information processing apparatus to perform an information processing method, the method comprising:
a step of controlling recording of management information containing access information corresponding to recording information for an information recording medium,
wherein the step of controlling the recording of the management information includes (a) recording a backup copy of the management information on a non-volatile recording medium prior to the recording of a master copy of the management information on the information recording medium, (b) recording the master copy of the management information after recording the backup copy of the management information and after verifying completion of the recorded backup copy of the management information, and (c) recording, upon the recording of the backup copy of the management information, a position information mapping table in which a recording destination of the master copy of the management information is mapped to a recording destination of the backup copy of the management information.

25. The information processing apparatus according to claim 1, wherein the access information includes a directory entry for a new file whereat the recording information is to be recorded, such that the recording controller records the backup copy of the management information including the directory entry for the new file on the non-volatile recording medium prior to the recording of the master copy thereof on the information recording medium.

* * * * *